(12) United States Patent
Fan et al.

(10) Patent No.: US 11,080,266 B2
(45) Date of Patent: Aug. 3, 2021

(54) GRAPH FUNCTIONAL DEPENDENCY CHECKING

(71) Applicant: Futurewei Technologies, Inc., Plano, TX (US)

(72) Inventors: Wenfei Fan, Edinburgh (GB); Xueli Liu, Edinburgh (GB); Yu Chen, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 241 days.

(21) Appl. No.: 16/049,055

(22) Filed: Jul. 30, 2018

(65) Prior Publication Data

US 2020/0034464 A1  Jan. 30, 2020

(51) Int. Cl.
G06F 16/23  (2019.01)
G06F 16/901  (2019.01)

(52) U.S. Cl.
CPC ...... G06F 16/2365 (2019.01); G06F 16/9024 (2019.01)

(58) Field of Classification Search
None
See application file for complete search history.

(56) References Cited

U.S. PATENT DOCUMENTS

| | | | | |
|---|---|---|---|---|
| 10,437,885 B2 * | 10/2019 | Zizka | ................ | G06F 8/70 |
| 2004/0034848 A1 * | 2/2004 | Moore | ................ | G06N 5/047 |
| | | | | 717/117 |
| 2005/0102325 A1 * | 5/2005 | Gould | ................ | G06F 16/24554 |
| 2007/0006070 A1 * | 1/2007 | Baartman | ................ | H04L 67/10 |
| | | | | 715/234 |
| 2008/0201705 A1 * | 8/2008 | Wookey | ................ | G06F 8/658 |
| | | | | 717/175 |
| 2009/0006302 A1 * | 1/2009 | Fan | ................ | G06F 16/215 |
| | | | | 706/48 |
| 2013/0226879 A1 * | 8/2013 | Talukder | ................ | G06F 16/20 |
| | | | | 707/690 |
| 2014/0019949 A1 * | 1/2014 | Craymer | ................ | G06F 8/456 |
| | | | | 717/150 |
| 2015/0169667 A1 * | 6/2015 | Roth | ................ | G06F 16/25 |
| | | | | 707/691 |

(Continued)

FOREIGN PATENT DOCUMENTS

| | | |
|---|---|---|
| CN | 1955957 A | 5/2007 |
| CN | 105094209 A | 11/2015 |
| CN | 107633099 A | 1/2018 |

OTHER PUBLICATIONS

Fan et al, "Parallel Reasoning of Graph Functional Dependencies", IEEE 34th International Conference on Data Engineering, 2018, 12 pages.*

(Continued)

Primary Examiner — Uyen T Le
(74) Attorney, Agent, or Firm — Schweeman Lundberg & Woessner, P.A.

(57) ABSTRACT

A computer implemented method for detecting errors in data includes obtaining one or more graph functional dependency (GFD) rules comprising a set of GFD rules, obtaining a set of GFDs representative of the data, building a canonical graph for the GFD rules, and determining that one or more GFD of the set of GFDs conflict based on the set of GFD rules and the canonical graph and, based thereon, determining an error in the set of GFDs.

20 Claims, 12 Drawing Sheets

(56) References Cited

U.S. PATENT DOCUMENTS

2017/0286526 A1 10/2017 Bar-or et al.
2019/0339967 A1* 11/2019 Moondhra .............. G06F 8/433

OTHER PUBLICATIONS

Wenfei Fan et al, "Big Graph Analyses: From Queries to Dependencies and Association Rules", Data Sci. Eng. (2017) 2:36-55. DOI 10.1007/s41019-016-0025-x, 20 pages, 2017.*
"International Application No. PCT/CN2019/098049, International Search Report and Written Opinion dated Oct. 31, 2019", (Oct. 31, 2019), 9 pgs.
Fan, Wenfei, et al., "Functional Dependencies for Graphs", SIGMOD'16, Jun. 26-Jul. 1, 2016, San Francisco, CA, USA, (Jun. 26, 2016), 15 pgs.

* cited by examiner

Algorithm ParSat
*Input:* A set $\Sigma$; of GFDs.
*Output:* true if $\Sigma$; is satisfiable, and false otherwise.
/* executed at coordinator $S_c$ */
1.     construct canonical graph $G_\Sigma$ and replicate it at each worker;
2.     create priority queue $W$ for work units, via dependency graph;
3.     invoke HomMatch with initial work unit $w$ at each worker $P_j$
        in parallel; remove $w$ from $W$;
4.     repeat until $W = \emptyset$;
5.         if $Sc$ receives a flag $f_j^c$ then
6.             terminate with false immediately;
7.         if $Sc$ receives a flag $f_j^d$ then
8.             send the first unit of $W$ to $P_j$; remove the unit from $W$;
9.         if $Sc$ receives a list $L_j$ of work units from a worker then
10.            add $L_j$ to the front of $W$;
11.     return true;
/* executed at each worker $P_j$ in parallel*/

*FIG. 8A*

Procedure Hom Match

*Input:* A work unit $w = (Q[z], \varphi)$; maintains $G_\Sigma$, $Eq_j$ and $\Delta Eq_j$.

*Output:* $\Delta Eq_j$, and Boolean flags.

1. repeat until all matches of $Q$ pivoted at $z$ are processed
2.     finds the next match $h(\bar{x})$ of $Q$ at $z$;
3.     $(\Delta Eq_j, f_j^c) := \text{CheckAttr}(h(\bar{x}), \varphi, \Delta Eq\ )$;
4.     if $f_j^c$ then send $f_j^c$ to coordinator $S_c$ and terminate;
5.     broadcast $\Delta Eq_j$ to all workers;
6.     if time spent exceeds TTL then
7.         construct a list $L_j$ of work units and send $L_j$ to $S_c$;
8.         complete the remaining work of $w$ excluding those in $L_j$;
9. send $f_j^d$ to $S_c$ and terminate;

*FIG. 8B*

Procedure CheckAttr

*Input:* A match $h(\bar{x})$, GFD $\varphi$, buffer $\Delta Eq^i$.

*Output:* Changes $\Delta Eq_j$, and Boolean flag $f_j^c$.

1. $Eq_j^{(1)} := Eq_j \cup \Delta Eq^i$; /* expand $Eq_j$ with $\Delta Eq^i$ */
2. expand $Eq_j^{(1)}$ to get $Eq_j^{(2)}$ by enforcing $\varphi$ at $\varphi$;
3. compute $\Delta Eq_j$; /* the difference between $Eq_j^{(2)}$ and $Eq$ */;
4. $Eq_j := Eq_j^{(2)}$;
5. if there exists a conflict in $Eq$, then return $(\emptyset, f_0^c = \text{true})$;
6. else return $(\Delta Eq_j, f_0^c = \text{false})$;

*FIG. 8C*

GRAPH FUNCTIONAL DEPENDENCY CHECKING

TECHNICAL FIELD

The present disclosure is related to functional dependency checking, and in particular to graph functional dependency checking.

BACKGROUND

When receiving unstructured data, such as social media data or other data from non-relational database sources, there may be inconsistencies in the data, such as an object having a top speed, but the data reflecting two different top speeds for the same object, or a domain expert stating one thing as true, but a non-expert in the domain stating the same thing as false. In a relational database, functional dependencies are constraints between two sets of attributes in a relation. Conflicts may be found without much difficulty. However, unstructured data may be represented by graphs. It is difficult to determine inconsistencies or conflicts in data represented by graphs.

SUMMARY

Various examples are now described to introduce a selection of concepts in a simplified form that are further described below in the detailed description. The Summary is not intended to identify key or essential features of the claimed subject matter, nor is it intended to be used to limit the scope of the claimed subject matter.

According to one aspect of the present disclosure, a computer implemented method for detecting errors in data includes obtaining one or more graph functional dependency (GFD) rules comprising a set of GFD rules, obtaining a set of GFDs representative of the data, building a canonical graph for the GFD rules, and determining that one or more GFD of the set of GFDs conflict based on the set of GFD rules and the canonical graph and, based thereon, determining an error in the set of GFDs.

Optionally, in any of the preceding aspects, a further implementation of the aspect includes wherein the canonical graph includes an empty graph and wherein a conflict comprises a literal assigned two distinct constants.

Optionally, in any of the preceding aspects, a further implementation of the aspect includes populating the empty graph by an Expand( ) operation prior to determining if any one of the GFDs conflicts iteratively for each rule.

Optionally, in any of the preceding aspects, a further implementation of the aspect includes wherein the canonical graph comprises a first graph pattern Q6 and a second graph pattern Q7, wherein the canonical graph includes two distinct copies of the first graph pattern.

Optionally, in any of the preceding aspects, a further implementation of the aspect includes wherein the set of GFD rules include a first rule: $\varphi_7 = Q_6 [x, y, z, w](\emptyset \rightarrow x.A = 0 \wedge y.B = 1)$, a second rule: $\varphi_9 = Q_6 [\bar{x}](y.B = 1 \rightarrow w.C = 1)$, and third rule: $\varphi_{10} = Q_7 [\bar{x}](w.C = 1 \rightarrow x.A = 1)$, wherein x, y, z, and w are vertices, and A, B, and C are attribute names Optionally, in any of the preceding aspects, a further implementation of the aspect includes creating work units for each graph pattern and graph pattern copy for each GFD rule, coordinating execution of the work units on multiple processors, sharing results from each processor in response to applying the rule associated with each work unit, and assigning remaining work units to processors in response to sharing results to the multiple processors.

Optionally, in any of the preceding aspects, a further implementation of the aspect includes creating a priority queue with the work units, processing the work units on different processors, and sharing changes with other processors.

Optionally, in any of the preceding aspects, a further implementation of the aspect includes receiving a new GFD rule and determining if the set of GFD rules implies the new GFD rule.

Optionally, in any of the preceding aspects, a further implementation of the aspect includes wherein determining if the set of GFD rules implies the new rule comprises enforcing GFDs on matches in the canonical graph one by one and terminating the method with true when either an equivalence relation is conflicting or when an implied attribute name is a part of the equivalence relation.

According to one aspect of the present disclosure, a device includes a memory storage comprising instructions and one or more processors in communication with the memory, wherein the one or more processors execute the instructions to obtain one or more graph functional dependency (GFD) rules comprising a set of GFD rules, obtain a set of GFDs representative of data, build a canonical graph for the GFD rules, determine that one or more GFD of the sets of GFDs conflicts based on the GFD rules and the canonical graph, and based thereon, determine an error in the set of GFDs.

Optionally, in any of the preceding aspects, a further implementation of the aspect includes wherein the canonical graph includes an empty graph and wherein the one or more processors execute the instructions to populate the empty graph by an Expand( ) operation prior to determining if any one of the GFDs conflicts iteratively for each rule, and wherein a conflict comprises a literal assigned two distinct constants.

Optionally, in any of the preceding aspects, a further implementation of the aspect includes wherein the canonical graph comprises a first graph pattern Q6 and a second graph pattern Q7, wherein the canonical graph includes two distinct copies of the first graph pattern, wherein the GFD rules include a first rule: $\varphi_7 = Q_6[x, y, z, w](\emptyset \rightarrow x.A = 0 \wedge y.B = 1)$, a second rule: $\varphi_9 = Q_6[\bar{x}](y.B = 1 \rightarrow w.C = 1)$, and third rule: $\varphi_{10} = Q_7[\bar{x}](w.C = 1 \rightarrow x.A = 1)$, wherein x, y, z, and w are vertices, and A, B, and C are attribute names.

Optionally, in any of the preceding aspects, a further implementation of the aspect includes wherein the one or more processors execute the instructions to create work units for each graph pattern and graph pattern copy for each GFD rule, coordinate execution of the work units on multiple processors, share results from each processor in response to applying the rule associated with each work unit, and assign remaining work units in response to sharing results to the multiple processors.

Optionally, in any of the preceding aspects, a further implementation of the aspect includes wherein the one or more processors execute the instructions to upon determining the set of GFDs does not conflict, receive a new GFD rule and determine if the set of rules implies the new GFD rule.

Optionally, in any of the preceding aspects, a further implementation of the aspect includes wherein determining if the set of rules implies the new rule comprises enforcing GFDs on matches in the canonical graph one by one and terminating with true when either an equivalence relation is conflicting or when the implied attribute name is a part of the equivalence relation.

Optionally, in any of the preceding aspects, a further implementation of the aspect includes wherein the one or more processors execute the instructions to create a priority queue with work units, process the work units on different processors, and share changes with other processors.

According to one aspect of the present disclosure, a computer-readable media stores computer instructions for detecting errors in data, that when executed by one or more processors cause the one or more processors to perform operations comprising obtaining a set of GFDs representative of the data, building a canonical graph for the GFD rules, and determining that one or more GFD of the set of GFDs conflict based on the set of GFD rules and the canonical graph and, based thereon, determining an error in the set of GFDs.

Optionally, in any of the preceding aspects, a further implementation of the aspect includes wherein the canonical graph comprises a first graph pattern Q6 and a second graph pattern Q7, wherein the canonical graph includes two distinct copies of the first graph pattern, and wherein the GFD rules include a first rule: $\varphi_7 = Q_6[x, y, z, w](\emptyset \to x.A = 0 \wedge y.B = 1)$, a second rule: $\varphi_9 = Q_6[\bar{x}](y.B = 1 \to w.C = 1)$, and third rule: $\varphi_{10} = Q_7[\bar{x}](w.C = 1 \to x.A = 1)$, wherein x, y, z, and w are vertices, and A, B, and C are attribute names.

Optionally, in any of the preceding aspects, a further implementation of the aspect includes wherein the operations further comprise creating work units for each graph pattern and copy for each GFD rule, coordinating execution of the work units on multiple processors, sharing results from each processor in response to applying the rule associated with each work unit, and assigning remaining work units in response to sharing results to the multiple processors.

Optionally, in any of the preceding aspects, a further implementation of the aspect includes wherein the operations further comprise creating a priority queue with the work units, processing the work units on different processors, and sharing changes with other processors.

BRIEF DESCRIPTION OF THE DRAWINGS

FIG. 8A is pseudocode representation of a parallel algorithm, ParSat, for determining satisfiability of a set of GFDs according to an example embodiment.

FIG. 8B is pseudocode representation of a procedure, HomMatch, used by ParSat for determining satisfiability of a set of GFDs according to an example embodiment.

FIG. 8C is pseudocode representation of a procedure CheckAttr, used by ParSat, for determining satisfiability of a set of GFDs according to an example embodiment.

DETAILED DESCRIPTION

Figure 1:
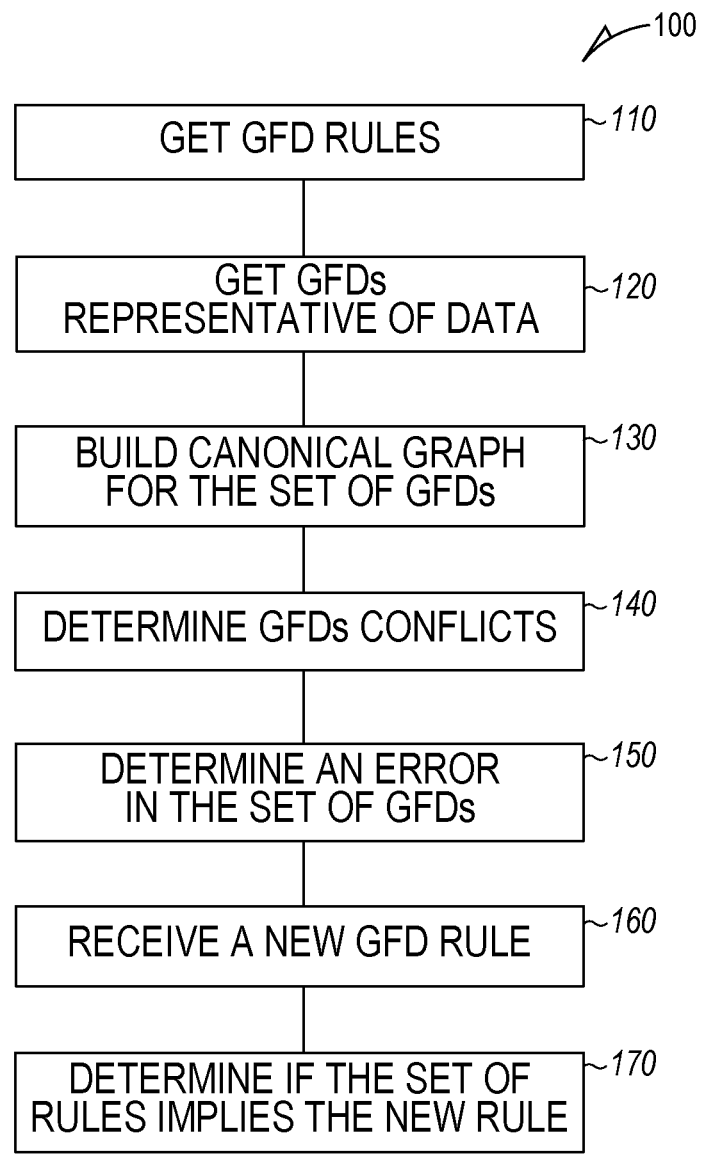
FIG. 1 is a flowchart illustrating a computer implemented method for detecting errors in data represented by graphs according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

When receiving unstructured data, such as social media data or other data from non-relational database sources, there may be inconsistencies in the data, such as an object having a top speed, but the data reflecting two different top speeds for the same object, or a domain expert stating one thing as true, but a non-expert in the domain stating the same thing as false. In a relational database, functional dependencies are constraints between two sets of attributes in a relation. Conflicts may be found without much difficulty. However, unstructured data may be represented by graphs. It is difficult to determine inconsistencies or conflicts in data represented by graphs.

Several classes of graph dependencies have recently been proposed to extend functional dependencies (FDs) from relations to graphs, referred to as graph functional dependencies (GFDs). The need for GFDs is evident in inconsistency detection, knowledge acquisition, knowledge base enrichment, and spam detection, among other things.

There are two fundamental problems for GFDs. One is the satisfiability problem, to decide whether a set Σ of GFDs has a model, i.e., a nonempty graph that satisfies all GFDs in Σ. The other is the implication problem, to decide whether a GFD φ is entailed by a set Σ of GFDs, i.e., for any graph G, if G satisfies Σ then G satisfies φ. These are classical problems associated with any dependency class, known as the static analyses.

These problems, satisfiability and implication are coNP-complete and NP-complete, respectively. In various embodiments, errors in data, such as unstructured data, represented by GFDs are detected by using algorithms for detecting satisfiability and implication of the GFDs. Parallel algorithms for both are also provided.

The satisfiability analysis enables checking whether a set Σ of GFDs discovered from (possibly dirty) real-life graphs is "dirty" itself before it is used to detect errors and spam. The implication analysis eliminates redundant GFDs that are entailed by others. That is, the implication analysis provides us with an optimization strategy to speed up, e.g., error detection process.

No matter how important, these problems are hard for GFDs. For relational FDs, the satisfiability problem is trivial: any set of FDs can find a nonempty relation that satisfies the FDs. The implication problem is in linear time. In contrast, for GFDs, the satisfiability and implication problems are coNP-complete and NP-complete, respectively. GFDs on graphs are more complicated than FDs on relations. A GFD is a combination of a graph pattern Q, to identify entities in a graph, and an "attribute dependency" $X \rightarrow Y$ that is applied to the entities identified. Since graph pattern matching is NP-complete under the semantics of homomorphism, the static analyses of GFDs are inevitably intractable.

In one embodiment, a small model property: a set Σ of GFDs is satisfiable if and only if (iff) there exists a graph G such that G satisfies Σ and the size |G| of G is bounded by the size |Σ| of Σ. This allows inspecting graphs G of a bounded size as candidate models of E. Based on the small model property, a sequential (exact) algorithm referred to as SeqSat, is used to check GFD satisfiability.

A parallel algorithm ParSat, may also used to check GFD satisfiability for large sets of GFD, such a social media data. ParSat is parallel scalable relative to SeqSat: its parallel running time is in O(t(|Σ|)/p), where t(|Σ|) denotes the cost of SeqSat and p is the number of processors used. As a result, ParS at enables reduced running time when more processors are used. Hence it is feasible to scale with large sets of GFDs, Σ, by increasing p, despite the intractability of GFD satisfiability.

In a further embodiment, GFD implication checking is parallelized. A further small model property: to check whether a set Σ of GFDs implies another GFD φ, suffices to inspect graphs of size bounded by the sizes of φ and Σ, and enforce the GFDs of Σ on the small graphs. Based on this, a sequential exact algorithm SeqImp is used to check GFD implication. A ParImp algorithm is obtained by parallelizing SeqImp. ParImp is parallel scalable relative to SeqImp, allowing scaling with large sets Σ of GFDs.

Algorithms ParSat and ParImp use one or more techniques for parallel reasoning by using a combination of datapartitioned parallelism and pipelined parallelism for early termination of checking. Dynamic workload assignment and work unit splitting may be used to handle stragglers. A topological order on work units may be based on a dependency graph.

These algorithms provide tools for reasoning about GFDs, to validate data quality rules and optimize rule-based process for cleaning graph data, among other things.

A computer implemented method for detecting errors in data is first described, followed by a description of example GFDs and supporting information regarding sequential and parallel algorithms for determining satisfiability and implication to detecting errors in data represented by sets of graphs.

FIG. 1 is a flowchart illustrating a computer implemented method 100 for detecting errors in data represented by graphs, such as directed graphs. Method 100 begins by the computer obtaining one or more graph functional dependency (GFD) rules at operation 110 and obtaining a set of GFDs at operation 120 representative of the data. The rules may contain one or more constraints, such as a vertices only having one value, or a value in one vertices implying a value in another vertices. The rules may be represented by edges between verticies in graph theory.

At operation 130, a canonical graph (a graph having a notation that is common) is built for each GFD rule. One or more of the sets of GFDs is determined to conflict based on the GFD rules and the canonical graph at operation 140. Based on the determination that a conflict exists, operation 150 determines that an error exists in the set of GFDs.

Once an error is determined, it is known that the set of graphs cannot be used for precise queries or possibly other data mining operations. A different set may then be tried until a set without errors is found. That set may be used for queries and other operations that benefit from known error free data.

The canonical graph includes an empty graph in one embodiment. A conflict is determined to exist when a literal is assigned two distinct constants as described in further detail below. The empty graph is populated by an Expand( ) operation prior to determining if any one of the GFDs conflicts iteratively for each rule. In one embodiment, the canonical graph comprises a first graph pattern Q6 and a second graph pattern Q7, and also includes two distinct copies of the first graph pattern Q6.

The GFD rules in one embodiment, include a first rule: $\varphi_7 = Q_6[x, y, z, w](\emptyset \rightarrow x.A = 0 \wedge y.B = 1)$, a second rule: $\varphi_9 = Q_6[\bar{x}] \ B = 1 \rightarrow w.C = 1)$, and third rule: $\varphi_{10} = Q_7[\bar{x}](w.C = 1 \rightarrow x.A = 1)$, wherein x, y, z, and w are vertices, and A, B, and C are attribute names.

In one embodiment, operation 160 includes receiving a new GFD rule, and operation 170 determines if the set of rules implies the new GFD rule. Operation 170 provides an efficient method of determining if the new GFD rule is satisfiable with the set of GFDs without having to start method 100 from the beginning.

Figure 2:
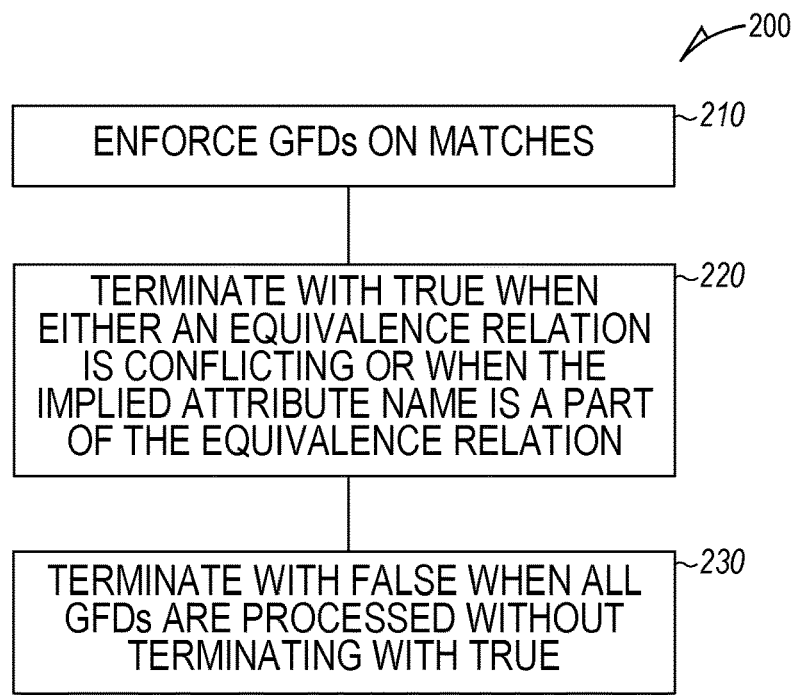
FIG. 2 is a flowchart illustrating a computer implemented method of determining if the set of rules implies a new rule according to an example embodiment.

FIG. 2 is a flowchart illustrating a method 200 of determining if the set of rules implies a new rule. At operation 210, GFDs are enforced on matches in the canonical graph one by one. The method is terminated at operation 220 with true in response to either an equivalence relation is conflicting or the implied attribute name is a part of the equivalence relation. The method is terminated with false at operation 230 when all GFDs are processed without terminating with true.

Figure 3:
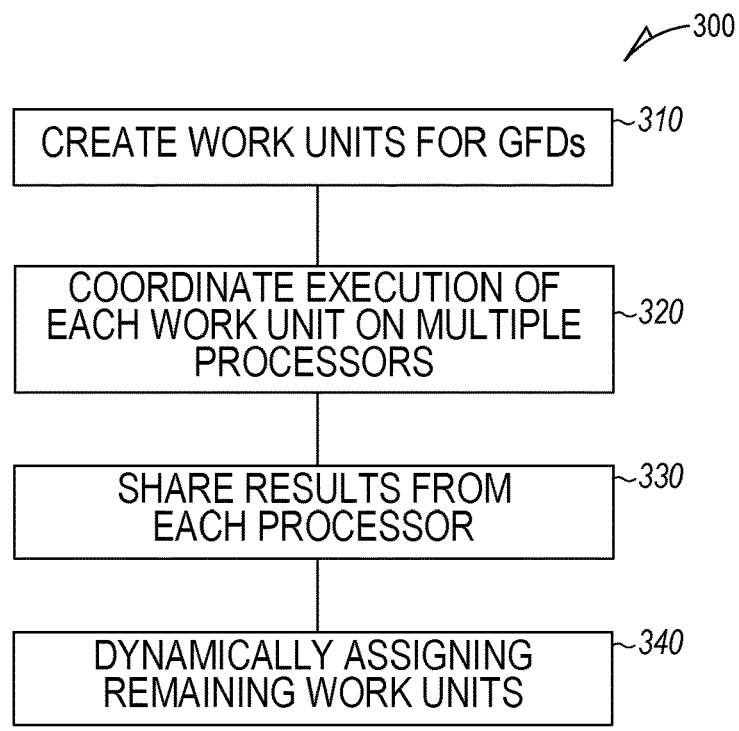
FIG. 3 is a flowchart illustrating a method of determining satisfiability of a set of graph functional dependencies (GFDs) utilizing parallel processing resources according to an example embodiment.

FIG. 3 is a flowchart illustrating a method 300 of determining satisfiability of a set of GFDs utilizing parallel processing resources. At operation 310, work units are created for each graph pattern for each GFD rule. A work unit is a set of candidate matches of a graph pattern to be checked as described in further detail below. Coordination of execution of each work unit on multiple processors is performed at operation 320. At operation 330, results from each processor are shared with other processors in response to applying the rule associated with each work unit. Remaining work units are assigned at operation 340 in response to sharing of the results to the multiple processors via operation 330.

Figure 4:
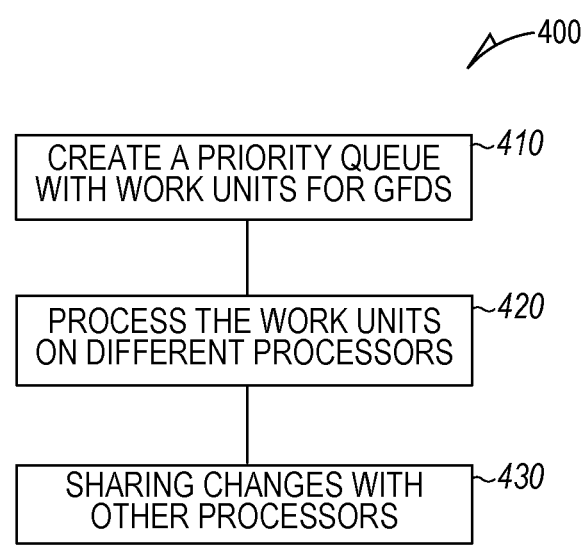
FIG. 4 is a flowchart illustrating method of implication checking for a set of GFDs utilizing parallel processing resources according to an example embodiment.

FIG. 4 is a flowchart illustrating method 400 of implementing implication checking for a set of GFDs utilizing parallel processing resources. A priority queue with work units is created at operation 410, and the work units are processed at operation 420 on different processors. At operation 430, the results on each processor are shared with other processors.

The sequential and parallel algorithms for both satisfiability and implication are now described in further detail. Some definitions of terms notations are first provided. Assume two countably infinite alphabets $\Gamma$ and $\theta$ for labels and attributes, respectively.

Graphs:

Directed graphs are defined as $G=(V, E, L, F_A)$, where (1) V is a finite set of vertices, also referred to as nodes; (2) $E \subseteq V \times V$, in which (v, v') denotes an edge from node v to v'; (3) each node $v \in V$ is labeled $L(v) \in \Gamma$; similarly L(e) is defined for edge $e \in E$; and (4) for each node v, $F_A(v)$ is a tuple $(A_1=a_1, \ldots, A_n=a_n)$, where a is a constant, $A_i \in \theta$ is an attribute of v, written as $v.A_i=a_i$, and $A_i \neq A_j$ if $i \neq j$; the attributes carry content as in property graphs.

A graph (V', E', L', F'$_A$) is a subgraph of (V, E, L, F$_A$) if $V' \subseteq V$, $E' \subseteq E$, for each node $v \in V'$, $L'(v)=L(v)$ and $F'_A(v)=F_A(v)$, and for each edge $e \in E'$, $L'(e)=L(e)$.

Graph Patterns:

A graph pattern is a graph $Q[\bar{x}]=(V_Q, E_Q, L_Q)$, where (1) $V_Q$ (resp. $E_Q$) is a finite set of pattern nodes (resp. edges); (2) $L_Q$ is a function that assigns a label $L_Q(u)$ (resp. $L_Q(e)$) to nodes $u \in V_Q$ (resp. edges $e \in E_Q$); and (3) $\bar{x}$ is a list of distinct variables denoting nodes in V.

Labels $L_Q(u)$ and $L_Q(e)$ are taken from $\Gamma$ and moreover, we allow $L_Q(u)$ and $L_Q(e)$ to be wildcard Pattern Matching.

A match of pattern $Q[\bar{x}]$ in a graph G is a homomorphism h from Q to G such that (a) for each node $u \in V_Q$, $L_Q(u)=L(h(u))$; and (b) for each edge e=(u, u') in Q, e'=(h(u), h(u')) is an edge in G and $L_Q(e)=L(e')$. In particular, $L_Q(u)=L(h(u))$ if $L_Q(u)$ is '_', i.e., wildcard indicates generic entities and can match any label in $\Gamma$.

The match is denoted as a vector $h(\bar{x})$ if it is clear from the context, where $h(\bar{x})$ consists of h(x) for each $x \in \bar{x}$. Intuitively, $\bar{x}$ is a list of entities to be identified by Q, and $h(\bar{x})$ is such an instantiation in G, one node for each entity.

Graph functional dependencies are referred to as GFDs, from syntax to semantics.

Syntax.

A GFD $\varphi$ is a pair $Q[\bar{x}](X \rightarrow Y)$ [1], where $Q[\bar{x}]$ is a graph pattern, called the pattern of $\varphi$; and X and Y are two (possibly empty) sets of literals of $\bar{x}$.

A literal of $\bar{x}$ is either x.A=c or x.A=y.B, where x and y are variables in x (denoting nodes in Q), A and B are attributes in $\theta$ (not specified in Q), and c is a constant.

GFD $\varphi$ specifies two constraints: (a) a topological constraint Q, and (b) an attribute dependency $X \rightarrow Y$. Pattern Q specifies the scope of the GFD: it identifies subgraphs of G on which $X \rightarrow Y$ is enforced. As observed in [2], attribute dependencies $X \rightarrow Y$ subsume relational EGDs and CFDs, in which FDs are a special case. In particular, literals x.A=c carry constant bindings along the same lines as CFDs [16]. Following [1], we refer to $Q[\bar{x}](X \rightarrow Y)$ as graph functional dependencies (GFDs).

Semantics.

For a match $h(\bar{x})$ of Q in a graph G and a literal x.A=c of $\bar{x}$, we say that $h(\bar{x})$ satisfies the literal if there exists attribute A at the node v=h(x) and v.A=c; similarly for literal x.A=y.B. We denote by $h(\bar{x})|=X$ if $h(\bar{x})$ satisfies all the literals in X; similarly for $h(\bar{x})|=Y$.

$h(\bar{x})|=X \rightarrow Y$ if $h(\bar{x})|=X$ implies $h(\bar{x})|=Y$.

A graph G satisfies GFD $\varphi$, denoted by $G|=\varphi$, if for all matches $h(\bar{x})$ of Q in G, $h(\bar{x})|=X \rightarrow Y$.

Intuitively, $G|=\varphi$ if for each match $h(\bar{x})$ identified by Q, the attributes of the entities in $h(\bar{x})$ satisfy $X \rightarrow Y$.

Example 1

Consider GFDs defined with patterns $Q_1$, $Q_2$, $Q_3$, and $Q_4$ shown in FIGS. 5A, 5B, 5C, and 5D respectively. These GFDs are able to catch semantic inconsistencies in real-life knowledge bases and social graphs. (1) GFD $\varphi_1=Q_1[x, y](\emptyset \rightarrow \text{false})$. It states that for any place x 510, if x is located in (edge 512) another place y 515, then y should not be part of (edge 517) x. Here X is $\emptyset$, and Boolean constant false is a syntactic sugar for, e.g., x.A=c and x.A=d with distinct constants c and d. The GFD is defined with a cyclic pattern $Q_1$.

In DBpedia, Bamburi_airport is located in city Bamburi, but at the same time, Bamburi is put as part of Bamburi airport. Hence DBpedia does not satisfy $\varphi_1$, and the violation is caught by match h:x $\mapsto$ Bamburi_airport and y $\mapsto$ Bamburi of $Q_1$. The inconsistency is detected by $\varphi_1$.

(2) GFD $\varphi_2=Q_2[x, y, z](\emptyset > y.val=z.val)$, where val is an attribute of y 520 and z 525. It says that the topSpeed is a functional property, i.e., an object x 530 has at most one top speed. Note that x is labeled wildcard '_', and may denote, e.g., car, plane.

The GFD catches the following error in DBpedia: tanks are associated with two topSpeed values, 24.076 and 33.336.

Figure 5A:
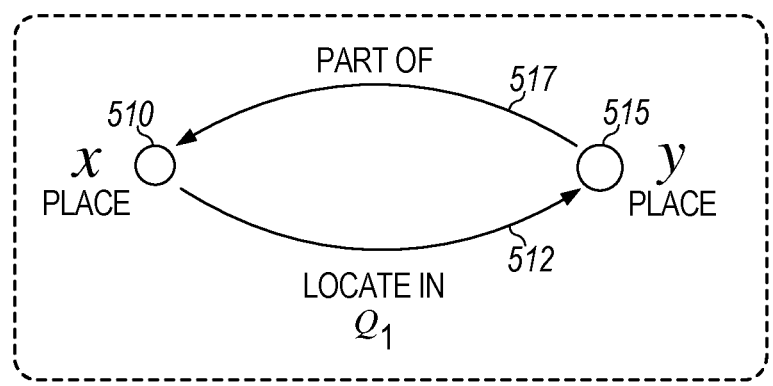
FIGS. 5A, 5B, 5C, and 5D are GFDs defined with patterns $Q_1$, $Q_2$, $Q_3$, and $Q_4$ respectively according to an example embodiment.
Figure 5B:
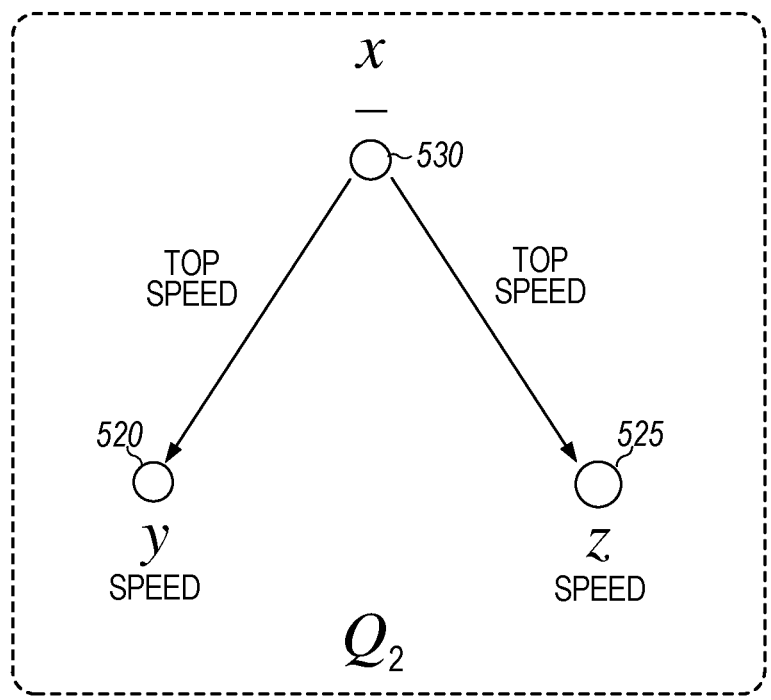
Figure 5C:
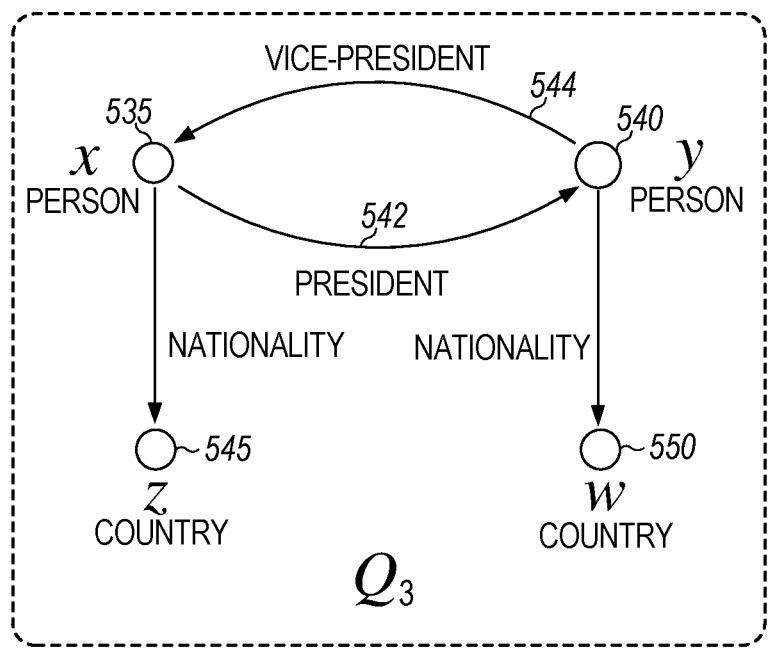
Figure 5D:
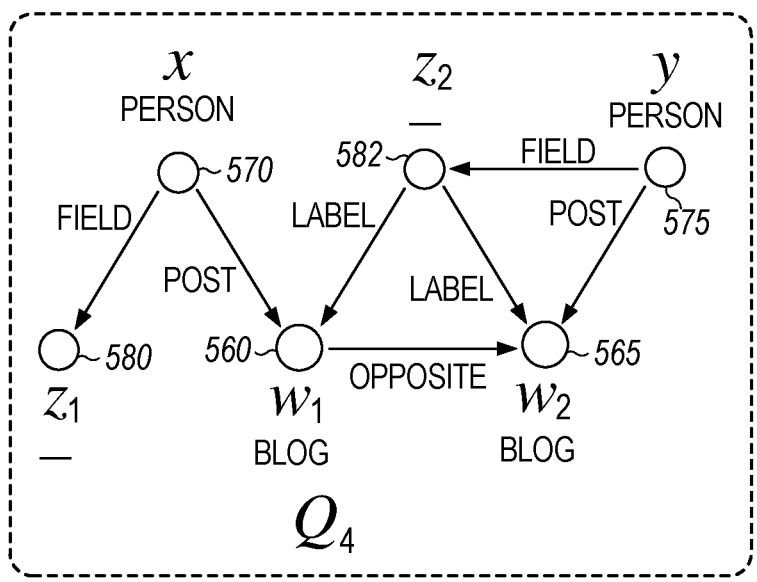

(3) GFD $\varphi_3=Q_3[x, y, z, w](x.c=y.c \rightarrow z.val=w.val)$, where c is an attribute of person x 535 and person y 540 indicating country, and val is an attribute of z 545 and w 550 indicating value, in this case, country as shown in FIG. 5C. The GFD states if person x 535 and person y 540 are the president and vice president of the same country as indicated by edges 542 and 544, then x and y must have the same nationality. It catches the following inconsistency in DBpedia: the president and vice-president of Botswana have nationality Botswana and Tswana, respectively, while Tswana is ethnicity, not nationality (4) GFD $\varphi_4=Q_4[x, y, z_1, z_2, w_1, w_2](w_1.\text{topic}=w_1.\text{topic} \rightarrow w_2.\text{trust}=\text{"low"})$, where $w_1$ 560 and $w_2$ 565 carry attribute topic. It states that in a social network, if blogs $w_1$ 560 and $w_2$ 565 are posted by people x 570 and y 575, respectively, $w_1$ 560 and $w_2$ 565 give inconsistent accounts of the facts on the same topic, and if x is a domain expert $z_1$ 580 on the subject but y is not $z_2$ 582, then the account given by y 575 has low credibility. For instance, if a computer scientist x and a politician y gave two accounts of facts about the future of databases, then the comment from y can be discounted.

Graphs are considered in some embodiments that typically do not have a schema, as found in the real world. Hence a node v may not necessarily have a particular attribute. For a literal x.A=c in X, if h(x) has no attribute A, then $h(\bar{x})$ trivially satisfies $X \rightarrow Y$ by the definition of $h(\bar{x})|=X$. In contrast, if x.A=c is in Y and h($\bar{x}$)|=Y, then h(x) must have attribute A by the definition of satisfaction; similarly for x.A=y.B.

In particular, if X is ∅, then h($\bar{x}$)|=X for any match h($\bar{x}$) of Q in G, and Y has to be enforced on h($\bar{x}$). In this case, if Y includes a literal x.A=c, then h(x) must carry attribute A. If Y=∅, then Y is true, and φ is trivially satisfied.

The following notations may be used to describe the satisfiability problem for GFDs.

A model of a set of GFDs (E) is a (finite) graph G such that (a) G|=Σ, i.e., G satisfies all GFDs in Σ, and (b) for each GFD Q[$\bar{x}$](X→Y) in Σ, there exists a match of Q in G.

Intuitively, if Σ has a model, then the GFDs in Σ are consistent, i.e., they do not conflict with each other, since all of them can be applied to the same graph. Σ is satisfiable iff Σ has a model. The satisfiability problem is to decide, given a set Σ of GFDs, whether Σ is satisfiable.

It is known that the problem is coNP-complete. However, there is no known way to develop a deterministic polynomial to check GFD satisfiability. In light of the absence of a deterministic polynomial, a small model property of the problem is established as described in further detail below. Based on the small model property, an exact algorithm for satisfiability checking is provided.

As opposed to relational FDs, a set Σ of GFDs may not be satisfiable. In fact, even if each GFD in Σ is satisfiable, Σ may not have a model, because the GFDs in Σ may interact with each other.

Example 2

Figure 6E:
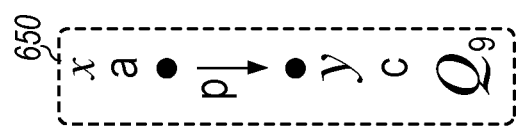
FIGS. 6A, 6B, 6C, 6D, and 6E are GFDs defined with distinct patterns $Q_5$, $Q_6$, $Q_7$, $Q_8$, and $Q_9$ respectively according to an example embodiment.
Figure 6D:
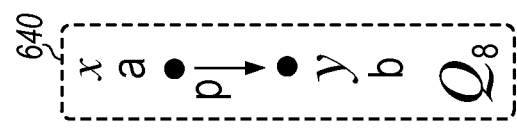
Figure 6C:
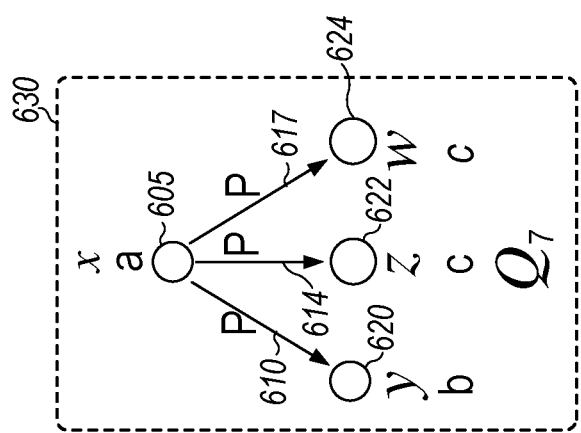
Figure 6B:
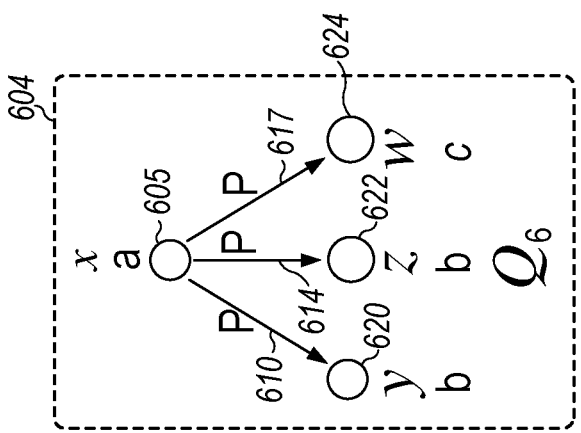
Figure 6A:
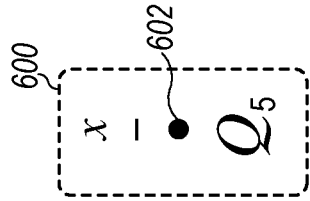

Consider two GFDs defined with the same pattern $Q_5$ 600 depicted in FIG. 6A: $φ_5=Q_5[x](∅→x.A=0)$ and $φ_6=Q_5[x](∅→x.A=1)$, where $Q_5$ 600 has a single node or vertices x 602 labeled '_'. No nonempty graph G satisfies both $φ_5$ and $φ_6$. For if such G exists, $φ_5$ and $φ_6$ require h(x).A to be 0 and 1, respectively, which is impossible; here h(x) is a match of x.

GFDs defined with distinct patterns may also interact with each other. Consider GFDs: $φ_7=Q_6[x, y, z, w](∅→x.A=0 ∧ y.B=1)$ and $φ_8=Q_7[x, y, z, w](y.B=1→x.A=1)$, with $Q_6$ 604 and $Q_7$ 630 shown in FIGS. 6B and 6C. $Q_6$ 604 has a node x 605 labeled "a" with edges 610, 614, 617 having a label "p" coupled to nodes y 620, z 622, and w 624 with attribute values of b, b and c respectively. $Q_7$ 630 has the same structure as $Q_6$ 604 with attribute values for y, z, w, of b, c, c. One can easily see that each of $φ_7$ and $φ_8$ has a model. However, there exists no model G for both $φ_7$ and $φ_8$. Indeed, if such G exists, then $Q_6$ 604 has a match h in G: h(x)↦v, h(y)↦$v_b$, h(z)↦$v_z$, h(w)↦$v_c$. Hence $φ_7$ applies to the match and enforces $v_b$.B=1. A match h' of $Q_7$ in G can be given as h'(x)↦v, h'(y)↦$v_b$, h'(z)↦$v_c$, h'(w)↦$v_c$, and $φ_8$ applies to the match since h'(x, y, z, w)|=h'(y).B=1. As a result, $φ_7$ and $φ_8$ require node v.A to be 1 and 0, respectively.

As shown by Example 2, while $Q_7$ 630 is not homomorphic to $Q_6$ 604 and vice versa, $φ_7$ and $φ_8$ can be enforced on the same node. Thus GFD satisfiability is nontrivial. It is shown coNP-hard by reduction from the complement of 3-colorability.

A Small Model Property

To find a model of a set Σ of GFDs, one cannot afford to enumerate all (infinitely many) finite graphs G and check whether G|=Σ. A small model property is established to reduce the search space.

A canonical graph $G_Σ$ of Σ is defined to be ($V_Σ$, $E_Σ$, $L_Σ$, $F_A^Σ$), where $V_Σ$ is the union of $V_i$'s, $E_Σ$ is the union of $E_i$'s, and $L_Σ$ is the union of $L_i$'s; but (d) $F_A^Σ$ is empty. It is assumed without loss of generality (w.l.o.g.) that patterns in Σ are pairwise disjoint, i.e., their nodes are denoted by distinct variables by renaming.

Intuitively, $G_Σ$ is the union of all graph patterns in Σ, in which patterns from different GFDs are disjoint. A wildcard _ of Q in $G_Q$ is kept and treated as a "normal" label such that only _ in a pattern can match _ in G.

Example 3

Consider a set Σ consisting of $φ_7$ and $φ_8$ of Example 2. Its canonical graph $G_Σ$ is the graph by putting together $Q_6$ 604 and $Q_7$ 630 of FIGS. 6B and 6C, except that variables x, y, z, w in $Q_7$ are renamed as, e.g., x', y', z', w', respectively.

A population of $G_Σ$ is a graph G=($V_Σ$, $E_Σ$, $L_Σ$, $F_A$), where $F_A$ is a function that for each node v∈$V_Σ$, assigns $F_A$(y)=($A_1=a_1$, ..., $A_m=a_m$), a (finite) tuple of attributes from θ and their corresponding constant values.

Population G of $G_Σ$ is said to be Σ-bounded if all attribute values in $F_A$ have total size bounded by O(|Σ|), i.e., the values of all attributes in G are determined by Σ alone.

Intuitively, G and $G_Σ$ have the same topological structure and labels, and G extends $G_Σ$ with attributes and values. It is Σ-bounded if its size |G| is in O(|Σ|), including nodes, edges, attributes and all constant values in G.

Small model property. To check the satisfiability of Σ, it suffices to inspect Σ-bounded populations of the canonical graph $G_Σ$ of Σ. A satisfiability checking algorithm is based on this small model property.

Theorem 1:

A set Σ of GFDs is satisfiable iff there exists a model G of Σ that is an Σ-bounded population of G.

Proof:

If there exists an Σ-bounded population of $G_Σ$ that is a model of Σ, then obviously Σ is satisfiable. Conversely, if Σ has a model G, then there exists a homomorphism h from $G_Σ$ to G. Employing h, a Σ-bounded population G' of $G_Σ$ is constructed. Attributes of G' are populated by taking only relevant attributes from G, and by normalizing these attributes to make them Σ-bounded. The population preserves the constant values that appear in Σ and the equality on the attributes. G'|=Σ is shown by contradiction.

As an immediate corollary, an alternative proof is provided for the upper bound of the satisfiability problem for GFDs, instead of revising and using the chase.

Corollary 2:

The GFDs satisfiability problem is in coNP.

Proof:

An NP algorithm is used to check whether a set Σ of GFDs is not satisfiable, as follows: (a) guess an Σ-bounded attribute population G of $Gs_Σ$, and a match $h_i$ for each pattern $Q_i$ of Σ in G; (b) check whether each $h_i$ makes a match; if so, (c) check whether the matches violate any GFD in Σ in G. The correctness follows from Theorem 1. The algorithm is in NP since steps (b) and (c) are in PTIME (polynomial time). Thus the satisfiability problem is in coNP. G cannot be guessed as above and checked whether G|=Σ, since checking G|=Σ is already coNP-complete itself.

A Sequential Algorithm for Satisfiability

Figure 7:
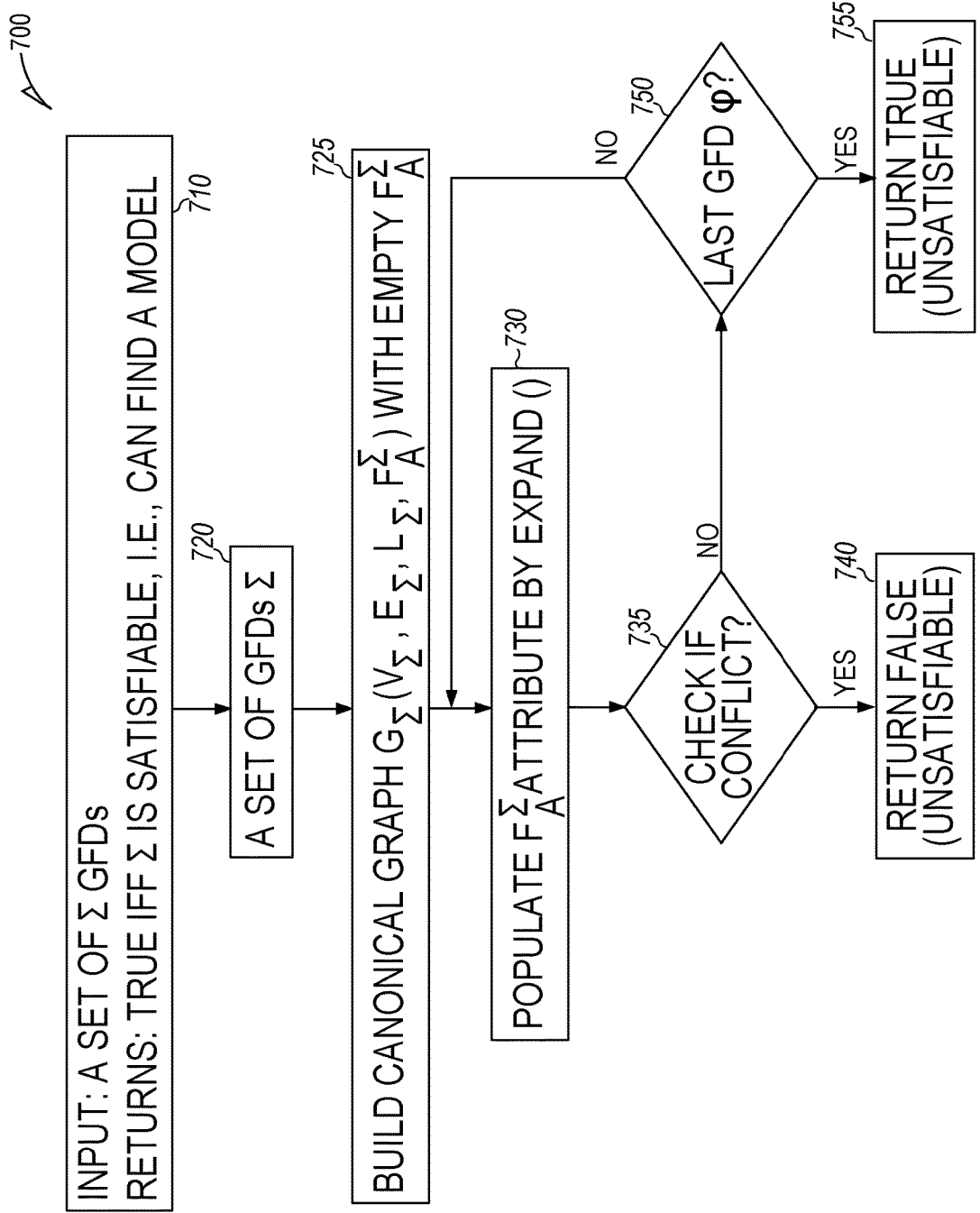
FIG. 7 is a flowchart illustrating a computer executable exact sequential algorithm, SeqSat, for determining satisfiability of a set of GFDs according to an example embodiment.

FIG. 7 is a flowchart illustrating a computer executable exact algorithm SeqSat 700 for determining satisfiability of a set of GFDs. Based on the small model property, SeqSat 700, takes as input a set Σ of GFDs, and returns true if and only if Σ is satisfiable as indicated at 710. The set of GFDs Σ is received as input at operation 720.

SeqSat 700 first, at operation 725 builds the canonical graph $G_\Sigma=(V_\Sigma, E_\Sigma, L_\Sigma, F_A^\Sigma)$ of $\Sigma$. It then processes each GFD (rule) $\varphi=Q[\bar{x}](X\rightarrow Y)$ in $\Sigma$ and populates $F_A^\Sigma$ by invoking procedure Expand at operation 730. Expand finds matches $h(\bar{x})$ of Q in $Gs_\Sigma$, and checks whether $h(\bar{x})\models X$. If so, SeqSat 700 adds attributes x.A to FE and/or instantiates attributes x.A with constants for each literal x.A=c or x.A=y.B in Y, i.e., it "enforces" $\varphi$ on the match $h(\bar{x})$. If a conflict emerges as checked at operation 735, i.e., if there exists x.A such that x.A is assigned two distinct constants, SeqSat 700 terminates with false at operation 740. The process iterates as indicated by decision operation 750 until all GFDs in $\Sigma$ are processed. If no conflict occurs, SeqSat 700 returns true at operation 755.

Algorithm SeqSat 700 supports early termination. It terminates with false at operation 740 as soon as a conflict is detected. Moreover, when a match $h(\bar{x})$ is found, it expands $F_A^\Sigma$ by enforcing $\varphi$ at match $h(\bar{x})$, instead of waiting until all matches of Q are in place.

The correctness of SeqSat 700 is assured by the following: (a) it suffices to inspect populations of $G_\Sigma$ by Theorem 1, and (b) attributes are populated by enforcing GFD $\varphi$ on each match $h(\bar{x})$ of Q, which is necessary for any population of $G_\Sigma$ to satisfy $\Sigma$, by the semantics of GFD satisfaction.

Equivalence class. To speedup checking, SeqSat 700 represents $F_\Sigma$ as an equivalence relation Eq. For each node $x \in V_\Sigma$ and each attribute A of x, its equivalence class, denoted by $[x.A]_{Eq}$, is a set of attributes y.B and constants c, such that x.A=y.B and x.A=c are enforced by GFDs in $\Sigma$ (see below). One can easily verify that Eq is reflexive, symmetric and transitive.

Given a GFD $\varphi=Q[\bar{x}](X\rightarrow Y)$ in $\Sigma$, Expand generates matches $h(\bar{x})$ of Q in $G_\Sigma$ along the same lines as VF2 [17] for subgraph isomorphism, except enforcing homomorphism rather than isomorphism. Then for each match $h(\bar{x})$ found, Expand checks whether $h(\bar{x})\models X$. If so, it expands Eq by enforcing $\varphi$ at $h(\bar{x})$, with the following rules.

(Rule 1) If l is x.A=c, it checks whether $[x.A]_{Eq}$ does not yet exist in Eq. If so, it adds $[x.A]_{Eq}$ to Eq and c to $[x.A]_{Eq}$. If $[x.A]_{Eq}$ has a constant $d\neq c$, it stops the process and SeqSat 700 terminates with false immediately.

(Rule 2) If l is x.A=y.B, it checks whether $[x.A]_{Eq}$ and $[y.B]_{Eq}$ are in Eq. If not, it adds the missing ones to Eq, and merges $[x.A]_{Eq}$ and $[y.B]_{Eq}$ into one. If the merged class includes distinct constants, SeqSat 700 terminates with false. That is, Expand generates new attributes, instantiates and equalizes attributes as required for the satisfiability of GFDs.

There is a complication when checking $h(\bar{x})\models X$. For a literal x.A=c in X, x.A may not yet exist in $F_A^\Sigma$ or is not instantiated (i.e., $[x.A]_{Eq}$ does not include any constant). To cope with this, the following method may be used.

(a) Algorithm SeqSat 700 processes GFDs of the form $Q[\bar{x}](\varnothing \rightarrow Y)$ first, if any in $\Sigma$. These add an initial batch of attributes.

(b) Expand maintains a list of matches $h(\bar{x})$ and an inverted index with attribute h(x).A that appears in X, but either $[h(x).A]_{Eq}$ does not exist or is not instantiated. When h(x).A is instantiated in a later stage, $h(\bar{x})$ is efficiently retrieved by the inverted index using h(x).A, and is checked again.

(c) At the end of the process of SeqSat 700, some attribute x.A in Eq may still not be instantiated. The missing values do not affect the decision of SeqSat 700 on the satisfiability of $\Sigma$, since we can always complete $F_t z$, by assigning a distinct constant to each of such $[x.A]_{Eq}$, without inflicting conflicts.

Example 4

Consider $\Sigma = \{(\varphi_7, \varphi_9, \varphi_{10}\}$, where $\varphi_7$ is given in Example 2, $\varphi_9=Q_6[\bar{x}](y.B=1\rightarrow w.C=1)$ and $\varphi_{10}=Q_7[\bar{x}](w.C=1\rightarrow x.A=1)$, with $Q_6$ 604 and $Q_7$ 630 of FIGS. 6B and 6C. Its canonical graph $G_\Sigma$ is similar to the one given in Example 3, with $Q_7$ 630 and two distinct copies of $Q_6$ 604 (from $\varphi_7$ and $\varphi_9$). Assume that SeqSat 700 checks $\omega_7, \varphi_{10}, \varphi_9$ in this order.

(1) For $\varphi_7$, Expand finds a match of $Q_6$ in $G_\Sigma$: $h(x)\mapsto x$, $h(y)\mapsto y$, $h(z)\mapsto z$, $h(w)\mapsto w$. Since $h(\bar{x})\models\varnothing$, it adds $[x.A]_{Eq}$ ($[y.B]_{Eq}$) to Eq and "0" ("1") to $[x.A]_{Eq}$ ($[y.B]_{Eq}$).

(2) When processing $\varphi_{10}$, Expand finds a match of $Q_7$ in $G_E$: $h'(x)\mapsto x$, $h'(y)\mapsto y$, $h'(z)\mapsto w$, $h'(w)\mapsto w$. As $[w.C]_{Eq}$ is not in Eq, it adds $(h'(\bar{x}), \varphi_{10})$ to an inverted index with w.C.

(3) When processing $\varphi_9$, Expand finds a match of $Q_6$: $h_1(x)\mapsto x$, $h_1(y)\mapsto y$, $h_1(z)\mapsto y$, $h_1(w)\mapsto w$. It adds w.C to $[y.B]_{Eq}$. This triggers re-checking of $(h'(\bar{x}), \varphi_{10})$ with the inverted index. Now $h'(\bar{x})\models w.C=1$. Expand adds "1" to $[x.A]_{Eq}$, to enforce $\varphi_{10}$. However, "0" is already in $[x.A]_{Eq}$, a conflict. Hence SeqSat 700 stops and returns false.

Analysis.

Algorithm SeqSat 700 enforces GFDs of $\Sigma$ by the semantics of GFDs. By Theorem 1, it returns true iff $\Sigma$ has a model. One can verify that SeqSat 700 guarantees to converge at the same result no matter in what order the GFDs of $\Sigma$ are applied, i.e., Church-Rosser, along the same lines as the characterization of GFD satisfiability. SeqSat 700 terminates early as soon as a conflict is spotted, and does not enumerate all matches by pruning to eliminate irrelevant matches early.

Algorithm SeqSat 700 is an exact algorithm. When $\Sigma$ is large, SeqSat 700 may be costly due to the intractable nature of the satisfiability problem. A parallel algorithm, ParSat 800, shown in pseudocode in FIG. 8A, is a parallelized algorithm for determining satisfiability of a set of graphs. ParSat 800 works with two procedures, HomMatch 830 in FIG. 8B, and CheckAttr 850 in FIG. 8C, both of which are shown in pseudocode form and are described in detail below.

A characterization of parallel algorithms is first described, followed by description of the parallel algorithm ParSat 800 with performance guarantees.

In general, a parallel algorithm for a problem may not necessarily reduce sequential running time. An algorithm $A_p$ for GFD satisfiability checking is parallel scalable relative to sequential algorithm SeqSat 700 if its running time can be expressed as:

$$T(|\Sigma|, p) = O\left(\frac{t(|\Sigma|)}{p}\right),$$

where $t(|\Sigma|)$ denotes the cost of SeqSat 700, and p is the number of processors employed by $A_p$ for parallel computation.

Intuitively, a parallel scalable $A_p$ linearly reduces the sequential cost of SeqSat 700 when p increases. By taking SeqSat 700 as a yardstick, $A_p$ guarantees to run faster when adding more processors, and hence scale with large $\Sigma$.

ParSat 800 is parallel scalable relative to SeqSat 700. ParSat 800 makes use of both data partitioned parallelism and pipelined parallelism to speed up the process and facilitate interactions between GFDs. ParSat 800 provides dynamic workload balancing and work unit splitting, to handle stragglers, i.e., work units that take substantially longer than the others. ParSat 800 deduces a topological order on work units to reduce the impact of their interaction, based on a dependency graph, and retains the early termination property of SeqSat 700.

Figure 9:
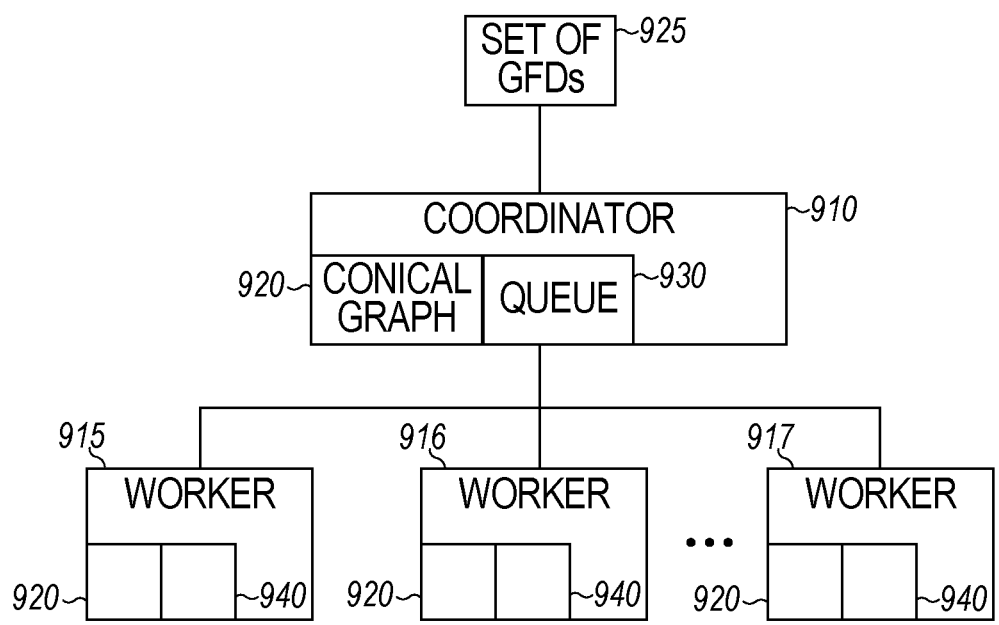
FIG. 9 is a block diagram illustrating a parallel processing system for performing parallel satisfiability and implication checking according to an example embodiment.

FIG. 9 is a block diagram illustrating a parallel processing system 900 for performing parallel satisfiability checking. ParSat 800 works with a coordinator $S_c$ 910 and p workers $(P_1, \ldots, P_p)$ 915, 916, 917. A canonical graph $G_\Sigma$ 920 is replicated at each worker 915, 916, 917, to reduce graph partition complication and communication costs. This is feasible since $G_\Sigma$ 920 is much smaller than real-life data graphs 925 such as social networks, which have billions of nodes and trillions of edges.

Work units: Consider a GFD $\varphi=Q[\bar{x}](X \rightarrow Y)$. To simplify the discussion, assume w.l.o.g. that Q is connected. A node $x \in \bar{x}$ is designated as a pivot of Q. A work unit w of $\Sigma$ is a pair $(Q[z], \varphi)$, where z is a node in $G_\Sigma$ that matches the label of x. Intuitively, w indicates a set of candidate matches of Q to be checked.

A pivot x is used to explore the data locality of graph homomorphism: for any v in $G_E$, if there exists a match h of Q in $G_\Sigma$ such that h(x)=v, then $h(\bar{x})$ consists of only nodes in the $d_Q$-neighbor of v. Here $d_Q$ is the radius of Q at v, i.e., the longest shortest path from v to any node in Q. The $d_Q$ neighbor of v includes all nodes and edges within $d_Q$ hops of v. Thus each candidate match v of x determines a work unit, namely, the $d_Q$-neighbor of v, and the work units may be checked in parallel. Ideally, a pivot x is chosen that is selective, i.e., the pivot x, carries a label that does not occur often in $G_\Sigma$; nonetheless, any node x in $\bar{x}$ can serve as a pivot.

When Q is disconnected, a work unit is $(Q[\bar{z}], \varphi)$, where $\bar{z}$ includes a pivot for each connected component of Q.

ParSat 800 works as follows, with lines of pseudocode numbered and referenced as lines 1-11 in FIG. 8A:

(1) Coordinator 910.

Given $\Sigma$ 925, coordinator $S_c$ 910 first (a) builds its canonical graph $G_\Sigma$ 920 and replicates $G_\Sigma$ at each worker (line 1), and (b) constructs a priority queue W 930 of all work units of $\Sigma$ (line 2), following a topological order based on a dependency graph of $\Sigma$ (see details below). Coordinator $S_c$ 910 then activates each worker $P_i$ with one work unit w from the front of W (line 3). In fact, work units can be assigned to worker in a small batch rather than a single w, to reduce the communication cost.

The coordinator 910 then interacts with workers and dynamically assigns workload, starting from the units of W with the highest priority (lines 4-10). A worker $P_i$ may send two flags to $S_c$: (a) $f_i^c$ if $P_i$ detects a conflict when expanding equivalence relation Eq; and (b) $f_i^d$ if $P_i$ is done with its work unit. If coordinator $S_c$ 910 receives $f_i^c$ for any $i \in [1, p]$, ParSat 800 terminates immediately with false (lines 5-6). If coordinator $S_c$ 910 receives $f_i^d$, it assigns the next unit w' in W to $P_i$ and removes w' from W (lines 7-8). The process iterates until either a conflict is detected, or W becomes empty, i.e., all work units have been processed. At this point algorithm ParSat 800 concludes that $\Sigma$ is satisfiable and returns true (line 11).

Figure 10:
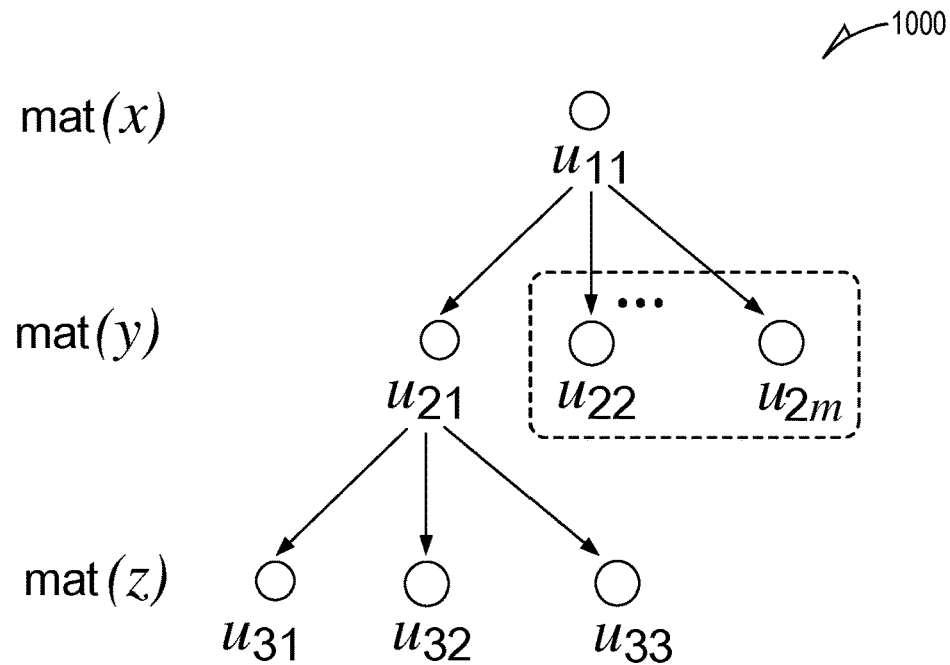
FIG. 10 is an illustration of splitting a work unit into a list of subunits according to an example embodiment.

A worker may split its unit w into a list $L_i$ of sub-units if w is a straggler as illustrated at 1000 in FIG. 10. Upon receiving $L_i$, coordinator $S_c$ 910 adds $L_i$ to the front of the priority queue W (lines 9-10). Putting these together, ParSat 800 implements data partitioned parallelism (by distributing work units of W), dynamic workload assignment, and early termination.

(2) Workers.

Each worker $P_i$ 915 maintains the following: (a) local canonical graph $G_\Sigma$ 920 in which an equivalence relation $Eq_i$ represents its local $F_A^\Sigma$, and (b) a buffer $\Delta Eq^i$ 940 that receives and stores updates to $Eq_i$ from other workers. It processes its work unit w locally and interacts with coordinator $S_c$ and other workers asynchronously as follows.

(a) Local Checking.

Upon receiving a work unit $(Q[z], \varphi)$, $P_i$ 915 conducts local checking in the $d_Q$-neighbor of z. This suffices to find matches $h(\bar{x})$ of Q in $G_\Sigma$ when the pivot x of Q is mapped to z, by the data locality of graph homomorphism.

Algorithm ParSat 800 implements Expand with two procedures: (i) HomMatch 830 finds matches $h(\bar{x})$ of Q in $G_\Sigma$ pivoted at z, and (ii) CheckAttr 850 expands Eq, by enforcing $\varphi$ at match $h(\bar{x})$ based on two expansion rules. ParSat 800 differs from Expand in the following. Each procedure has lines identified with consecutive line numbers referred to below.

The two procedures work in pipeline: as soon as a match $h(\bar{x})$ is generated by HomMatch 830, CheckAttr 850 is triggered to check $h(\bar{x})$ in a different thread, instead of waiting for all matches of Q to be found (lines 2-3 of HomMatch 830).

When enforcing $\varphi$ at $h(\bar{x})$ CheckAttr 850 computes $Eq_i^{(1)}=Eq_i \cup \Delta Eq^i$, incorporating changes $\Delta Eq^i$ from other workers, and CheckAttr 850 expands $Eq_i^{(1)}$ to $Eq_i^{(2)}$ with $\varphi$.

If a conflict emerges, i.e., if some class $[y.B]_{Eq_i^{(2)}}$ includes distinct constants, worker $P_i$ sends flag $f_i^c$ to coordinator Sc and terminates the process (line 4). After all matches of Q pivoted at z are processed, $P_i$ sends flag $f_i^d$ to $S_c$ (line 9).

Like procedure Expand, CheckAttr 850 also maintains an inverted index on matches $h(\bar{x})$ that need to be re-checked upon the availability of (instantiated) attributes needed.

(b) Interaction.

Worker $P_i$ broadcasts its local changes $\Delta Eq_i$ to other workers (line 5). It keeps receiving changes $\Delta Eq^i$ from other processors and updates its local $Eq_i$ by CheckAttr 850. The communication is asynchronous, i.e., there is no need to coordinate the exchange through Sc. This does not affect the correctness of ParSat 800 since equivalence relation Eq is monotonically expanding, and a conflict $f_i^c$ terminates the process no matter at which worker $f_i^c$ emerges.

Example 5

Recall $\Sigma=\{\varphi_7, \varphi_9, \varphi_{10}\}$ from Example 4. Its canonical graph $G_\Sigma$ includes two copies of $Q_6[x, y, z, w]$ and a copy of $Q_7[x, y, z, w]$, in which variable x (designated as a pivot) in the three patterns is renamed as $x_1$, $x_2$, $x_3$, respectively; similarly for variables y, z, w.

ParSat 800 works with coordinator Sc and two workers $P_1$ and $P_2$. ParSat 800 first creates a priority queue W, where W has 9 work units $w_i=(Q_6[x_i], \varphi_7)$, $w_{3+i}=(Q_6[x_i], \varphi_9)$ and $w_{6+i}=(Q_7[x_i], \varphi_{10})$ in this order, for $i \in [1, 3]$ (see Example 7). Then $S_c$ sends $w_1$ to $P_1$ and $w_2$ to $P_2$. It then dynamically assigns the remaining units to $P_1$ and $P_2$ one by one following the order of W, upon receiving $f_j^d$ for $j \in [1, 2]$.

Suppose that at a stage, worker $P_1$ has processed $w_1$, $w_3$ and $w_5$, and $P_2$ has handled $w_2$, $w_4$ and $w_6$. After $P_1$ is done with $w_5$, it sends $f_1^d$ to $S_c$ and gets a new work unit $w_7$. At this point, $Eq_1$ at $P_1$ includes $[x_1.A]_{Eq_1}=\{0, x_2.A, x_3.A\}$ and $[y_1.B]_{Eq_1}=\{1, y_2.B, y_3.B, z_1.C, z_3.C, w_1.C, w_2.C, w_3.C\}$, after incorporating changes made at $P_2$. Now Expand finds a match $h(\bar{x})$ $h(x) \mapsto x_1$, $h(y) \mapsto y_2$, $h(z) \mapsto w_1$ and $h(w) \mapsto w_1$ at $P_1$. Assume w.l.o.g. that $\Delta Eq^1=\emptyset$, i.e., no new changes are passed from $P_2$. By enforcing $\varphi_{10}$ at match $h(\bar{x})$ CheckAttr 850 obtains $\Delta Eq_1$, which requires to add 1 to $[x.A]_{Eq_1}$. At this point, ParSat 800 finds a conflict: both 0 and 1 are in $[x.A]_{Eq_1}$. Hence CheckAttr 850 sends $f_1^c$ to $S_c$. When $S_c$ receives $f_1^c$, ParSat 800 returns false and terminates.

Parallel checking may be sped up in at least two ways, unit splitting, and by the use of a dependency graph.

Unit Splitting.

A work unit $w=(Q[z],\varphi)$ assigned to a worker $P_i$ may become a straggler and is "skewed". ParSat 800 handles stragglers as follows. Recall that matching dominates the cost of w, and HomMatch 830 computes matches via backtracking like in VF2. When HomMatch 830 is triggered, it starts keeping track of the time $\tau$ spent on w. If $\tau$ exceeds a threshold TTL, it picks a set $L_i$ of partial match $h(\overline{y})$ of Q, i.e., $\overline{y}$ is a proper sub-list $\overline{x}$. It treats $(Q[\overline{y}], \varphi)$ as a work unit, and sends $L_i$ to $S_c$ (lines 6-7). Worker $P_i$ resets $\tau=0$ and continues with the remaining work of w excluding those in $L_i$ (line 8).

Coordinator $S_c$ adds $L_i$ to the front of W, and distributes the units to workers as usual. Upon receiving such $(Q[\overline{w}],\varphi)$, worker $P_j$ resumes the checking from $Q[\overline{w}]$.

Example 6

Consider a work unit $w=(Q[u_{11}],\varphi)$, where $\varphi=Q[x, y, z](X\rightarrow Y)$, in which x is pivoted at $u_{11}$. Suppose that at one point, HomMatch 830 finds a match h(x, y, z): $x\mapsto u_{11}$, $y\mapsto u_{21}$ and $z\mapsto u_{32}$ as shown in FIG. 10 at 1000, and the time spent on w has exceeded TTL. Hence HomMatch 830 decides to split w. It creates a list $L_i$ consisting of $w_j=(Q[u_{11}, u_{2j}],\varphi)$ for $j\in[2, m]$, where $w_j$ corresponds to a partial match $h_i[x, y]$: $x\mapsto u_{11}$ and $y\mapsto u_{2i}$, and it does not include match for z; here partial matches $h_i$ are found by backtracking one step. HomMatch 830 sends $L_i$ to $S_c$, restarts counter $\tau$ and continues to complete the processing of the current match h(x, y, z), to process, e.g., matches in which z ranges over $u_{32}$ and $u_{33}$.

Upon receiving $L_i$, coordinator $S_c$ 910 adds its units to the front of the priority queue and assigns them to available workers as usual. When, e.g., $w_j$ is sent to a worker $P_k$, $P_k$ resumes the processing of $w_1$ starting from partial match $h_i[x, y]$.

Dependency Graph.

A priority queue W of work units is built as indicated at line 2 of ParSat 800. A dependency graph $G_d=(V,E)$, is constructed, where V is the set of work units, and $(w_1,w_2)$ is a directed edge if (a) there exists an attribute x.A that appears in both $Y_1$ and $X_2$, where $w_1=(Q_1[z_1],\phi_1)$, $w_2=(Q_2[x_2],\phi_2)$, $\phi_1=Q_1[\overline{x}_1](X_1\rightarrow Y_1)$, $\phi_2=Q_2[\overline{x}_2](X_2\rightarrow Y_2)$, i.e., the antecedent $X_2$ of $\phi_2$, may depend on the consequence $Y_1$ of $\phi_1$; and (b) $z_2$ is within $d_{Q_1}$ hops of $z_1$, i.e., the two pivots are close enough to interact.

ParSat 800 deduces a topological order from $G_d$ and sorts W accordingly. Note that work units for GFDs $Q[\overline{x}](\emptyset\rightarrow Y)$ are at the front of queue W, with the highest priority.

Example 7

Figure 11:
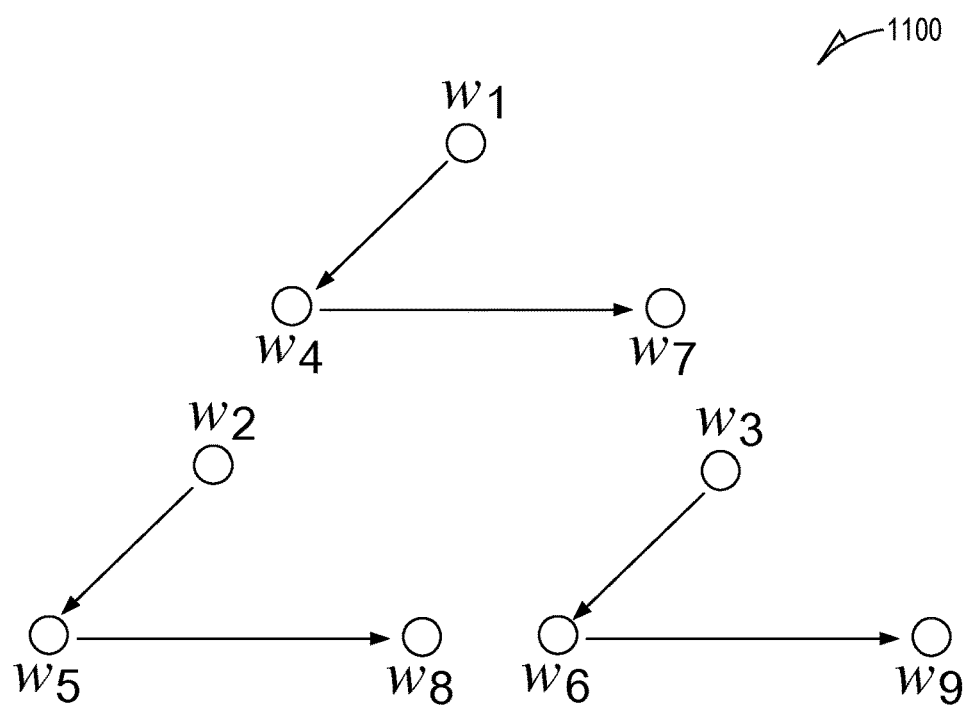
FIG. 11 is an illustration of a dependency graph used to determine an order of performing work units according to an example embodiment.

For the 9 work units of Example 5, the dependency graph $G_d$ is depicted in FIG. 11 at 1100. There exists an edge $(w_1,w_4)$ since $w_1$ and $w_4$ are both pivoted at $x_1$, $w_1$ carries $\varphi_7=Q_6[x, y, z, w](\emptyset\rightarrow x.A=0 \wedge y.B=1)$, $w_4$ carries $\varphi_9=Q_6[\overline{w}](y.B=1\rightarrow w.C=1)$, and y.B is in both the consequence of $\varphi_7$ and the antecedent of $\varphi_9$; similarly for other edges in FIG. 11. In contrast, there is no edge between $w_2$ and $w_4$ since their pivots are not close, although they also carry $\varphi_7$ and $\varphi_9$, respectively. From $G_d$ a topological order is deduced, to sort the work units of Example 5.

As another optimization strategy, ParSat 800 also extracts common sub-patterns that appear in multiple GFDs of $\Sigma$, finds matches of the sub-patterns at common pivots early, and reuses the matches when processing relevant GFDs. This is a common practice of multi-query optimization. To avoid the complexity of finding common sub-patterns, following, graph simulation is used to check whether a pattern $Q_1$ is homomorphic to a sub-pattern $Q_2'$ of $Q_2$. If $Q_1$ does not match $Q_2'$ by simulation, then $Q_1$ is not homomorphic to $Q_2'$. Since graph simulation is in $O(|Q_1|\cdot|Q_2'|)$ time, this method reduces the (possibly exponential) cost of checking homomorphism.

The correctness of ParS at 800 is warranted by Theorem 1 and the fact that equivalence relation Eq is monotonically increasing, similar to the inflational semantics of fixpoint computation. ParSat 800 parallelizes SeqSat 700, and is parallel scalable relative to SeqSat 700 by dynamic work unit assignment to balance workload, and work unit splitting to handle stragglers. One can verify by induction on the number of work units that the parallel runtime of ParSat 800 is in $$O\left(\frac{t(|\Sigma|)}{p}\right),$$

where $t(|\Sigma|)$ denotes the cost of SeqSat 700.

Implication checking may also be performed in a serial or parallel manner A set $\Sigma$ of GFDs implies another GFD $\varphi$, denoted by $\Sigma\models\varphi$, if for all graphs G, if $G\models\Sigma$ then $G\models\varphi$.

The implication problem for GFDs is to decide, given a finite set $\Sigma$ of GFDs and another GFD $\varphi$, whether $\Sigma\models\varphi$. A small model property of the implication problem is used in one embodiment. Capitalizing on the small model property, a sequential exact algorithm SeqImp is used to perform implication checking. SeqImp may be parallelized to provide a parallel scalable algorithm ParImp.

A Small Model Property of GFD Implication

For traditional FDs over relations, the implication analysis takes linear time. When it comes to GFDs, however, the story is more complicated.

Example 8

Consider a set $\Sigma=\{\varphi_{11}, \varphi_{12}\}$ of GFDs, where $\varphi_{11}=Q_8[\overline{x}](\emptyset\rightarrow x.A=1)$, $\varphi_{12}=Q_9[\overline{x}](x.A=1\wedge y.B=2\rightarrow y.C=2)$, and pattern $Q_8$ 640 and $Q_9$ 650 are shown in FIG. 6D and FIG. 6E respectively. Consider $\varphi_{13}=Q_7[\overline{x}](z.B=2\rightarrow z.C=2)$, with $Q_7$ in FIG. 6C. Then $\Sigma\models\varphi_{13}$. Indeed, for any graph G such that $G\models\Sigma$, and for any match $h(\overline{x})$ of $Q_7$ in G, $h(\overline{x})$ can be written as $h(x)\mapsto u_1$, $h(y)\mapsto u_2$, $h(z)\mapsto u_3$, $h(w)\mapsto u_4$, where $u_i$ is in G for $1\leq i\leq 4$. If $h(\overline{x})\models z.B=2$, then by enforcing $\varphi_{11}$ and $\varphi_{12}$ on $h(\overline{x})$, $u_1.A=1$, $u_3.B=2$ and $u_3.C=2$. Then $h(\overline{x})\models z.C=2$. Hence $G\models\varphi_{13}$. Note that $\varphi_{13}$ is not implied by each of $\varphi_{11}$ and $\varphi_{12}$ alone. However, when $\varphi_{11}$ and $\varphi_{12}$ are put together, they can deduce the consequence z.C=2 of $\varphi_{13}$.

Now consider $\varphi_{14}=Q_7[\overline{x}](x.A=0\rightarrow z.C=2)$. Again, one can verify that $\Sigma\models\varphi_{14}$. This is because for any graph G and any match $h(\overline{x})$ of $Q_7$ in G, if $G\models\Sigma$ then $h(\overline{x})\not\models h(x).A=0$, since $\varphi_{11}$ enforces $h(x).A=0$. That is, $Q_7$, x.A=0 and $\Sigma$ are "inconsistent" when put together.

The implication problem may be derived by proving a small model property. This is more involved than its counterpart for satisfiability. Notations include the following.

Canonical Graphs.

Consider $\varphi=Q[\overline{x}](X\rightarrow Y)$, where $Q=(V_Q, E_Q, L_Q)$. The canonical graph of $\varphi$ is $G_Q^X=(V_Q, E_Q, L_Q, F_A^X)$, where $F_A^X$ is defined as follows. For each node $x\in V_Q$ (i.e., each $x\in\overline{x}$), (a) if x.A=c is in X, then $F_A^X(x)$ has attribute A with x.A=c;

(b) if x.A=y.B is in X, then $F_A^X$ (x) has attributes A and B such that x.A=y.B; and moreover, (c) $F_A^X$ is closed under the transitivity of equality, i.e., if x.A=y.B and y.B=z.C, then x.A=z.C; similarly if x.A=c and z.C=c, then x.A=z.C.

A wildcard _ of Q is kept in $G_Q$ just like in $G_\Sigma$. A $(\Sigma,\varphi)$-bounded population of $G_Q^X$ for canonical graph $G_Q^X$ of $\varphi$ as a population of $G_Q^X$ such that its size is in $O(|E|+|\varphi|)$ is defined. To check whether $\Sigma \models \varphi$, it suffices to populate the canonical graph $G_Q^X$.

Theorem 3:

For any set $\Sigma$ of GFDs and GFD $\varphi=Q[\bar{x}](X \to Y)$, $\Sigma \models \varphi$ iff for all $(\Sigma,\varphi)$-bounded populations G of $G_Q^X$, either (a) $G \not\models \Sigma$, or (b) $G \models \Sigma$ and $G \models \varphi$.

Proof:

If $\Sigma \models \varphi$, then for all graphs G, if $G \models \Sigma$ then $G \models \varphi$. These graphs include $(\Sigma,\varphi)$-bounded populations of $G_Q^X$. From this it follows that conditions (a) and (b) hold.

Conversely, assume that $\Sigma \not\models \varphi$, i.e., there exists a graph G such that $G \models \Sigma$ but $G \not\models \varphi$. A $(\Sigma,\varphi)$-bounded population G' of $G_Q^X$ is constructed such that $G' \models \Sigma$ but $G' \not\models \varphi$, violating conditions (a) and (b). The construction makes use of the "witness" of $G \not\models \varphi$ (the match of the pattern of in G that violates $\varphi$), and requires attribute value normalization as in the proof of Theorem 1, such that the total size of attributes in G are in $O(|E|+|\varphi|)$ (see [15] for details).

Checking Implication.

To check whether $\Sigma \models \varphi$, Theorem 3 allows inspection of $(\Sigma,\varphi)$-bounded populations G of $G_Q^X$ only. However, all such small graphs are checked, exponentially many in total. To further reduce the search space, a corollary of Theorem 3 is proven.

Notations are provided. Recall equivalence class Eq representing $F_A^\Sigma$. Given a GFD $\phi=Q'[\bar{x}'](X' \to Y')$ in $\Sigma$ and a match h' of Q' in $G_Q^X$, Eq can be expanded by enforcing $\phi$ at h' with the two rules.

A list H of such pairs (h', $\phi$) is referred to as a partial enforcement of $\Sigma$ on $G_Q^X$. $Eq_H$ is used to denote the expansion of Eq by H, by enforcing $\phi$ at h' one by one.

$Eq_H$ is conflicting if there exists $[x.A]_{Eq_H}$ that includes distinct constants c and d. Intuitively, this means that the GFDs in H and Q, X are inconsistent.

Recall that $\varphi=Q[\bar{x}](X \to Y)$. $Y \subseteq Eq_H$ is written if for any literal u=v, $v \in [u]_{Eq_H}$ where u=v is either x.A=c or x.A=y.B. That is, the literal can be deduced from the equivalence relation $Eq_H$ via the transitivity of equality.

Corollary 4:

For any set $\Sigma$ of GFDs and $\varphi=Q[\bar{x}](X \to Y)$, $\Sigma \models \varphi$ iff there exists a partial enforcement H of $\Sigma$ on $G_Q^X$ such that either $Eq_H$ is conflicting, or $Y \subseteq Eq_H$. The two cases of Corollary 4 are illustrated in Example 8.

Proof:

If $\Sigma \models \varphi$, then such an H exists by Theorem 3, since each $Eq_H$ is a $(\Sigma,\varphi)$-bounded population of $G_Q^X$.

Conversely, the following is shown by induction on the length of H. (1) If $Eq_H$ is conflicting, then for all $(\Sigma,\varphi)$-bounded populations G of $G_Q^X$. $G \not\models \Sigma$. (2) If $Y \subseteq Eq_H$, then for all $(\Sigma,\varphi)$-bounded populations G of $G_Q^X$, if $G \models \Sigma$, then $G \models \varphi$. From this and Theorem 3 it follows that $\Sigma \models \varphi$.

Corollary 4 allows checking of $\Sigma \models \varphi$ by selectively inspecting H, instead of enumerating all $(\Sigma,\varphi)$-bounded populations. Leveraging Corollary 4, the following is verified along the same lines as the proof of Corollary 2.

Corollary 5:

The GFD implication problem is in NP.

Sequential Algorithm for Implication

Capitalizing on Corollary 4, an exact sequential algorithm, SeqImp, for checking GFD implication is provided. SeqImp takes as input a set $\Sigma$ of GFDs and another GFD $\varphi$. It returns true if $\Sigma \models \varphi$, and false otherwise. Let $\varphi=Q[\bar{x}](X \to Y)$. Similar to SeqSat 700 for satisfiability checking, algorithm SeqImp enforces GFDs of $\Sigma$ on matches of Q in the canonical graph $G_Q^X$ one by one, and terminates as soon as $\Sigma \models \varphi$ can be decided. It has the following subtle differences from SeqImp.

(a) In contrast to SeqSat 700 that starts with Eq initially empty, SeqImp uses $Eq_H$ to represent partial enforcement, initialized as $Eq_X$, the (nonempty) equivalence relation encoding $F_A^X$.

(b) SeqImp terminates with true when either (i) $Eq_H$ is conflicting, or (ii) $Y \subseteq Eq_H$. It terminates with false when all GFDs are processed, if neither conflict is detected nor $Y \not\subseteq Eq_H$ in the entire process, concluding that $\Sigma \not\models \varphi$.

Example 9

Recall $\Sigma$ and $\varphi_{13}$ from Example 8. The canonical graph of $\varphi_{13}$ is $Q_7$ of FIG. 6C with $F_A^X=\{z.B=2\}$. Given these, SeqImp initializes $Eq_H$ with $[z.B]_{Eq}=\{2\}$. It expands $Eq_H$ at (a) a match $h(\bar{x})$ of $Q_8$: $x_8 \mapsto x$ and $y_8 \mapsto y$, and (b) a match $h'(\bar{x})$ of $Q_9$: $x_9 \mapsto x$, $y_9 \mapsto z$, where $x_i$ and $y_i$ denote variables x and y, respectively, in $Q_i$ for $i \in [8, 9]$. After enforcing $\varphi_{11}$ and $\varphi_{12}$ at $h(\bar{x})$ and $h'(\bar{x})$ respectively, it finds that $(z.C=2) \subseteq Eq_H$, and terminates with true.

Now for $\varphi_{14}$. SeqImp starts with $F_A^X=\{x.A=0\}$. After enforcing $\varphi_{11}$ at $h(\bar{x})$ it adds "1" to $[x.A]_{Eq}$, a conflict with $[x.A]_{Eq}=\{0\}$. Hence SeqImp returns true and terminates.

Analysis.

The correctness of SeqImp follows from Corollary 4. Its complexity is dominated by generating matches of graph patterns in $\Sigma$, while $Y \subseteq Eq_H$ and conflicts in $Eq_H$ can be checked efficiently. In particular, the equivalence relation $Eq_H$ can be computed in linear time with index. Moreover, one can verify that the length of $Eq_H$ is bounded by $|Q| \cdot |\Sigma|$.

Algorithm ParImp is a parallel scalable relative to SeqImp. Hence ParImp is capable of dealing with large set $\Sigma$ of GFDs by adding processors as needed. ParImp works with a coordinator $S_c$ and p workers ($P_1, \ldots, P_p$), like ParS at 800. It first constructs the canonical graph $G_Q^X$ of $\varphi$, initializes $Eq_H$ as $Eq_X$, and replicates $G_Q^X$ and $Eq_H$ at each worker.

$Eq_H$ is expanded in parallel by distributing work units across p workers. A work unit $(Q_\phi[z],\phi)$ is defined in the same way as previously described for GFDs $\phi=Q_\phi[\bar{x}_\phi](X_\phi \to Y_\phi)$ in $\Sigma$ at pivots z in $G_Q^X$. The work units are organized in a priority queue W as before, based on a revised notion of dependency graph (see below). Algorithm ParImp dynamically assigns work units of W to workers, starting with the ones with the highest priority, in small batches. Workers process their assigned work units in parallel, broadcast their local $Eq_H$ expansions to other workers, and send flags to $S_c$. The process proceeds until (a) either at a partial enforcement H of G at some worker, $Eq_H$ has conflict or $Y \subseteq Eq_H$, or (b) all work units in W have been examined. The process returns true in case (a), and false in case (b), by Corollary 4.

ParImp employs the same dynamic workload assignment and unit splitting strategies of ParS at 800 to handle stragglers. ParImp also supports a combination of data partitioned parallelism and pipelined parallelism. It differs from ParSat 800 in the following.

(a) Dependency Graph.

ParImp deduces a topological order on W also based on the dependency graph of work units. The only difference is that a unit $(Q_\phi[z],\phi)$ is associated with the highest priority if $\phi=Q_\phi[\bar{x}_\phi](X_\phi \to Y_\phi)$ and X subsumes $X_\phi$, i.e., each literal in $X_\phi$ can be deduced from $Eq_X$.

(b) Early Termination.

Each worker $P_i$ sends flag $f_i^c$ to coordinator if either (i) a conflict is detected in its local copy of $Eq_H$, or (ii) $Y \subseteq Eq_H$. Upon receiving $f_i^c$, algorithm ParImp terminates immediately with true, regardless of what $P_i$ is.

Example 10

Assume a coordinator $S_c$ and two workers $P_1$ and $P_2$. Given $\Sigma$ and $\varphi_{13}$ of Example 9, ParImp creates the canonical graph of $\varphi_{13}$ and replicates it at $P_1$ and $P_2$, where $Eq_{(H,i)}$ at $P_i$ is initialized as $Eq_H$ for $i \in [1, 2]$. ParImp creates a priority queue $W=[w_1=(Q_8[x], \varphi_{11}), w_2=(Q_9[x], \varphi_{12})]$. Then $S_c$ sends $w_1$ to $P_1$ and $w_2$ to $P_2$. After $P_1$ enforces $\varphi_{11}$ on match $h(\bar{x})$ given in Example 9, it sends changes $\Delta Eq_{(H,1)} = \{[x.A]_{Eq_{(H,1)}}=\{1\}, [z.B]_{Eq_{(H,1)}}=\{2\}\}$ to $P_2$. Worker $P_2$ enforces $\varphi_{12}$ on match $h'(\bar{x})$ (Example 9). By incorporating changes from $P_1$, $P_2$ adds z.C to $[z.B]_{Eq_{(H,2)}}$, which contains value 2. As a result, $(z.C=2) \subseteq Eq_{(H,2)}$. Hence it sends $f_2^c$ to $S_c$ and ParImp terminates with true.

Now consider $\varphi_{14}$ instead of $\varphi_{13}$. ParImp creates priority queue $W=[w_1=(Q_9[x], \varphi_{12}), w_2=(Q_8[x], \varphi_{11})]$. Note that W is different from the queue for $\varphi_{13}$, since the initial $Eq_H$ includes $[x.A]_{Eq_H}=\{0\}$. Coordinator $S_c$ sends $w_1$ to $P_1$ and $w_2$ to $P_2$. When $P_2$ enforces $\varphi_{11}$ on match $h'(\bar{x})$ it adds "1" to $[x.A]_{Eq_{(H,2)}}$, but "0" is already in $[x.A]_{Eq_{(H,2)}}$. Thus $P_2$ sends $f_2^c$ to $S_c$ and ParImp stops with true.

Analysis.

The correctness of ParImp is assured by Corollary 4 and monotonic expansion of $Eq_H$. ParImp is parallel scalable relative to SeqImp by dynamic workload balancing and unit splitting. Formally, one can show that ParSat 800 takes $$O\left(\frac{t(|\Sigma|, |\varphi|)}{p}\right)$$

time with p workers, where $t(|\Sigma|,|\varphi|)$ is the cost of SeqImp, by induction on the number of work units.

Figure 12:
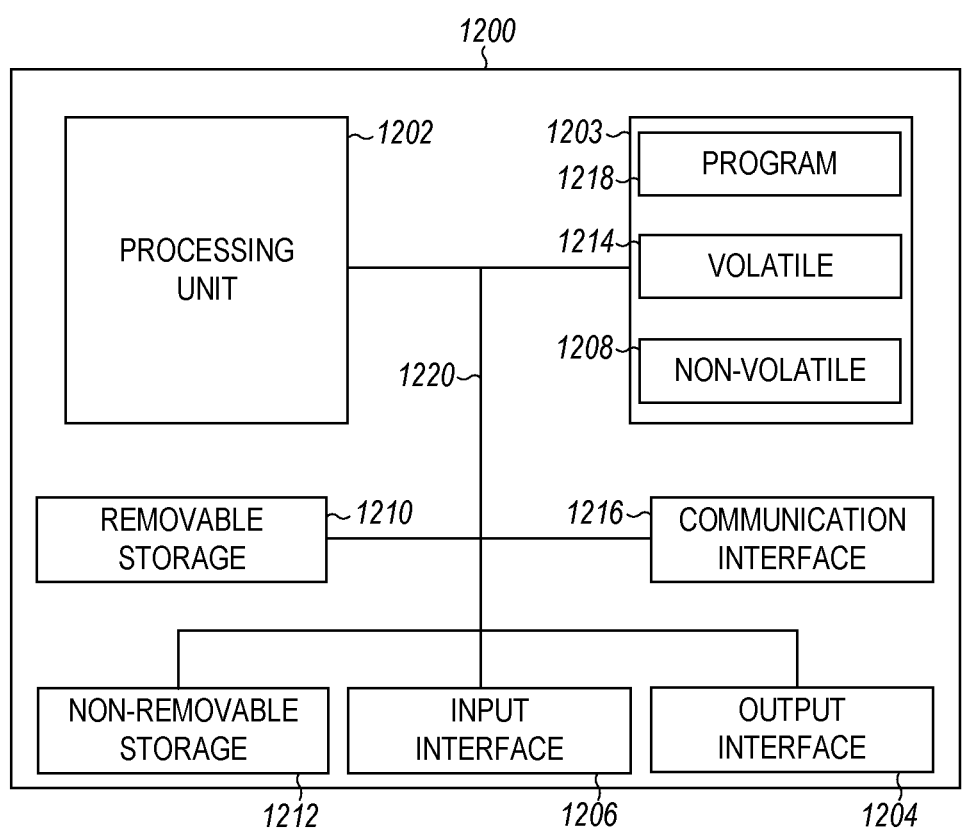
FIG. 12 is a block diagram illustrating circuitry for processing resources for implementing algorithms and performing methods according to example embodiments.

FIG. 12 is a block diagram illustrating circuitry for executing one or more of the sequential and parallel satisfiability and implication algorithms and for performing methods according to example embodiments. All components need not be used in various embodiments.

One example computing device in the form of a computer 1200 may include a processing unit 1202, memory 1203, removable storage 1210, and non-removable storage 1212. Although the example computing device is illustrated and described as computer 1200, the computing device may be in different forms in different embodiments. For example, the computing device may instead be a smartphone, a tablet, smartwatch, or other computing device including the same or similar elements as illustrated and described with regard to FIG. 12. Devices, such as smartphones, tablets, and smartwatches, are generally collectively referred to as mobile devices or user equipment. Further, although the various data storage elements are illustrated as part of the computer 1200, the storage may also or alternatively include cloud-based storage accessible via a network, such as the Internet or server-based storage.

Memory 1203 may include volatile memory 1214 and non-volatile memory 1208. Computer 1200 may include—or have access to a computing environment that includes—a variety of computer-readable media, such as volatile memory 1214 and non-volatile memory 1208, removable storage 1210 and non-removable storage 1212. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 1200 may include or have access to a computing environment that includes input interface 1206, output interface 1204, and a communication interface 1216. Output interface 1204 may include a display device, such as a touchscreen, that also may serve as an input device. The input interface 1206 may include one or more of a touchscreen, touchpad, mouse, keyboard, camera, one or more device-specific buttons, one or more sensors integrated within or coupled via wired or wireless data connections to the computer 1200, and other input devices.

The computer may operate in a networked environment using a communication connection to connect to one or more remote computers, such as database servers. The remote computer may include a personal computer (PC), server, router, network PC, a peer device or other common DFD network switch, or the like. The communication connection may include a Local Area Network (LAN), a Wide Area Network (WAN), cellular, WiFi, Bluetooth, or other networks. According to one embodiment, the various components of computer 1200 are connected with a system bus 1220.

Computer-readable instructions stored on a computer-readable medium are executable by the processing unit 1202 of the computer 1200, such as a program 1218. The program 1218 in some embodiments comprises software that, when executed by the processing unit 1202, performs operations according to any of the embodiments included herein. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage, such as a storage area network (SAN). Computer program 1218 may be used to cause processing unit 1202 to perform one or more methods or algorithms described herein.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A computer implemented method for detecting errors in data comprising:
   obtaining a set of graph functional dependency (GFD) rules;
   obtaining a set of GFDs representative of the data, each GFD comprising a graph pattern to identify entities in a graph and an attribute dependency applied to the entities;

building a canonical graph for the set of GFDs, the canonical graph defined by a union of graph patterns that are pairwise disjoint;
determining that one or more GFDs of the set of GFDs conflict with each other based on the set of GFD rules and the canonical graph; and
determining an error in the set of GFDs based on the determining that the one or more GFDs conflict.

2. The method of claim 1 wherein the canonical graph includes an empty graph and wherein a conflict between GFDs comprises a literal assigned two distinct constants.

3. The method of claim 2 further comprising populating the empty graph by expanding attributes of the empty graph prior to determining that the one or more GFDs conflict, and wherein GFD conflicts are determined iteratively.

4. The method of claim 1 wherein the canonical graph comprises a first graph pattern Q6 and a second graph pattern Q7, wherein the canonical graph includes two copies of the first graph pattern Q6.

5. The method of claim 4 wherein the set of GFD rules include a first rule: $\varphi\_7 = Q6\ [x, y, z, w](\emptyset \rightarrow x.A=0 \wedge y.B=1)$, a second rule: $\varphi\_9 = Q6\ [x^-](y.B=1 \rightarrow w.C=1)$, and a third rule: $\varphi\_10 = Q7\ [x^-](w.C=1 \rightarrow x.A=1)$, wherein x, y, z, and w are vertices, A, B, and C are attribute names, $\emptyset \rightarrow x.A=0$ is an attribute dependency, and $\emptyset$ is a set of literals.

6. The method of claim 5, further comprising:
creating work units for each graph pattern and graph pattern copy for each GFD rule of the set of GFD rules;
coordinating execution of the work units on multiple processors;
sharing results from each processor in response to applying the GFD rule associated with each work unit; and
assigning remaining work units to processors in response to sharing results to the multiple processors.

7. The method of claim 6, further comprising:
creating a priority queue with the work units;
processing the work units on different processors;
updating an equivalence relation with changes; and
sharing changes with other processors.

8. The method of claim 1 further comprising:
receiving a new GFD rule; and
determining if the set of GFD rules implies the new GFD rule.

9. The method of claim 8 wherein determining if the set of GFD rules implies the new GFD rule comprises:
enforcing GFDs on matches in the canonical graph one by one; and
terminating the method with true when an equivalence relation is conflicting.

10. A device comprising:
a memory storage comprising instructions; and
one or more processors in communication with the memory, wherein the one or more processors execute the instructions to:
obtain a set of graph functional dependency (GFD) rules;
obtain a set of GFDs representative of data, each GFD comprising a graph pattern to identify entities in a graph and an attribute dependency applied to the entities;
build a canonical graph for the set of GFDs, the canonical graph defined by a union of graph patterns that are pairwise disjoint;
determine that one or more GFDs of the set of GFDs conflict based on the GFD rules and the canonical graph; and
determine an error in the set of GFDs based on the determining the one or more GFDs conflict.

11. The device of claim 10 wherein the canonical graph includes an empty graph, wherein the one or more processors execute the instructions to populate the empty graph by expanding attributes of the empty graph prior to determining that the one or more GFDs conflict, and wherein GFD conflicts are determined iteratively.

12. The device of claim 10 wherein the canonical graph comprises a first graph pattern Q6 and a second graph pattern Q7, wherein the canonical graph includes two copies of the first graph pattern Q6, wherein the GFD rules include a first rule: $\varphi\_7 = Q6\ [x, y, z, w](\emptyset \rightarrow x.A=0 \wedge y.B=1)$, a second rule: $\varphi\_9 = Q6\ [x^-](y.B=1 \rightarrow w.C=1)$, and a third rule: $\varphi\_10 = Q7\ [x^-](w.C=1 \rightarrow x.A=1)$, wherein x, y, z, and w are vertices, A, B, and C are attribute names, $\emptyset \rightarrow x.A=0$ is an attribute dependency, and $\emptyset$ is a set of literals.

13. The device of claim 12 wherein the one or more processors execute the instructions to:
create work units for each graph pattern and graph pattern copy for each GFD rule of the set of GFD rules;
coordinate execution of the work units on multiple processors;
share results from each processor in response to applying the GFD rule associated with each work unit; and
assign remaining work units in response to sharing results to the multiple processors.

14. The device of claim 10 wherein the one or more processors execute the instructions to:
upon determining the set of GFDs does not conflict, receive a new GFD rule; and
determine if the set of GFD rules implies the new GFD rule.

15. The device of claim 14 wherein determining if the set of GFD rules implies the new GFD rule comprises:
enforcing GFDs on matches in the canonical graph one by one; and
terminating with true when an equivalence relation is conflicting.

16. The device of claim 15 wherein the one or more processors execute the instructions to:
create a priority queue with work units;
process the work units on different processors;
updating an equivalence relation with changes; and
share changes with other processors.

17. A computer-readable media storing computer instructions for detecting errors in data, that when executed by one or more processors cause the one or more processors to perform operations comprising:
obtaining a set of graph functional dependency (GFD) rules;
obtaining a set of GFDs representative of the data, each GFD comprising a graph pattern to identify entities in a graph and an attribute dependency applied to the entities;
building a canonical graph for the set of GFDs, the canonical graph defined by a union of graph patterns that are pairwise disjoint;
determining that one or more GFDs of the set of GFDs conflict based on the set of GFD rules and the canonical graph; and
determining an error in the set of GFDs based on the determining the one or more GFDs conflict.

18. The computer-readable media of claim 17 wherein the canonical graph comprises a first graph pattern Q6 and a second graph pattern Q7, wherein the canonical graph includes two copies of the first graph pattern Q6, wherein the GFD rules include a first rule: $\varphi\_7 = Q6\ [x, y, z, w](\emptyset \rightarrow x.A=0 \wedge y.B=1)$, a second rule: $\varphi\_9 = Q6\ [x^-]$ (y.B=1→w.C=1), and a third rule: φ_10=Q7 [x⁻] (w.C=1→x.A=1), wherein x, y, z, and w are vertices, A, B, and C are attribute names, Ø→x.A=0 is an attribute dependency, and Ø is a set of literals.

19. The computer-readable media of claim 18 wherein the operations further comprise:
   creating work units for each graph pattern and copy for each GFD rule of the set of GFD rules;
   coordinating execution of the work units on multiple processors;
   sharing results from each processor in response to applying the GFD rule associated with each work unit; and
   assigning remaining work units in response to sharing results to the multiple processors.

20. The computer-readable media of claim 19 wherein the operations further comprise:
   creating a priority queue with the work units;
   updating an equivalence relation with changes;
   processing the work units on different processors; and
   sharing changes with other processors.

* * * * *